US012602447B2

(12) United States Patent
Abrahami et al.

(10) Patent No.: US 12,602,447 B2
(45) Date of Patent: *Apr. 14, 2026

(54) SYSTEM AND METHOD FOR THIRD PARTY APPLICATION ACTIVITY DATA COLLECTION

(71) Applicant: Wix.com Ltd., Tel Aviv (IL)

(72) Inventors: Yoav Abrahami, Tel Aviv (IL); Kfir Bloch, Ramat Gan (IL); Nitzan Achsaf, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 426 days.

This patent is subject to a terminal disclaimer.

(21) Appl. No.: 18/311,908

(22) Filed: May 4, 2023

(65) Prior Publication Data

US 2023/0273971 A1      Aug. 31, 2023

Related U.S. Application Data

(63) Continuation of application No. 14/559,943, filed on Dec. 4, 2014, now Pat. No. 11,669,584, which is a
(Continued)

(51) Int. Cl.
*G06F 16/95*          (2019.01)
*G06F 16/958*          (2019.01)

(52) U.S. Cl.
CPC .................................. *G06F 16/958* (2019.01)

(58) Field of Classification Search
None
See application file for complete search history.

(56) References Cited

U.S. PATENT DOCUMENTS

| 8,244,848 B1 | 8/2012 | Narayanan | |
| 8,543,457 B2 * | 9/2013 | Staib .................. | G06Q 30/0633 |
| | | | 705/26.7 |

(Continued)

FOREIGN PATENT DOCUMENTS

| CN | 101556669 | 10/2009 |
| CN | 102307210 | 1/2012 |

(Continued)

OTHER PUBLICATIONS

International Search Report for corresponding PCT application PCT/IB2014/066589 mailed on Aug. 28, 2015.
(Continued)

*Primary Examiner* — Howard Cortes
(74) *Attorney, Agent, or Firm* — Heidi Brun Associates Ltd.; Heidi M. Brun

(57) ABSTRACT

A system for a website, includes a processor and a unit running on the processor to capture interactions between a user of the website and at least one third party application embedded as an instance in a page of the website and to use the interactions to update a contact record associated with a user. The unit includes a data extractor to extract contact related information from the interactions; and a data merger to merge at least two contact records where the at least two contact records have an association with the same identified user and to merge the extracted contact related information to that of an existing contact record for the identified user according to predefined merging rules.

13 Claims, 24 Drawing Sheets

Related U.S. Application Data continuation-in-part of application No. 14/176,166, filed on Feb. 10, 2014, now Pat. No. 10,509,850.

(60) Provisional application No. 61/911,485, filed on Dec. 4, 2013, provisional application No. 61/762,902, filed on Feb. 10, 2013.

(56) References Cited

U.S. PATENT DOCUMENTS

| | | |
|---|---|---|
| 11,669,584 B2 | 6/2023 | Abrahami |
| 2002/0083006 A1 | 6/2002 | Tamayo |
| 2002/0198943 A1 | 12/2002 | Zhuang |
| 2003/0220812 A1 | 11/2003 | Jones |
| 2004/0034591 A1 | 2/2004 | Waelbroeck |
| 2004/0049589 A1 | 3/2004 | Papanikolaou |
| 2004/0268228 A1 | 12/2004 | Croney |
| 2005/0192863 A1 | 9/2005 | Mohan |
| 2008/0082627 A1 | 4/2008 | Allen |
| 2008/0098456 A1 | 4/2008 | Alward |
| 2008/0140476 A1 | 6/2008 | Anand |
| 2008/0294515 A1 | 11/2008 | Rupp |
| 2009/0006206 A1 | 1/2009 | Groe |
| 2009/0070443 A1 | 3/2009 | Vanderhook |
| 2009/0157732 A1 | 6/2009 | Hao |
| 2010/0057560 A1 | 3/2010 | Skudlark |
| 2010/0057834 A1 | 3/2010 | Macken |
| 2010/0100952 A1 | 4/2010 | Sample |
| 2010/0251340 A1 | 9/2010 | Martin |
| 2010/0313009 A1 | 12/2010 | Combet |
| 2011/0029665 A1 | 2/2011 | Wenig |
| 2011/0054920 A1 | 3/2011 | Phillips |
| 2011/0179176 A1 | 7/2011 | Ravichandran |
| 2011/0184813 A1 | 7/2011 | Barnes |
| 2011/0289010 A1 | 11/2011 | Rankin, Jr. |
| 2012/0084151 A1 | 4/2012 | Kozak |
| 2012/0203639 A1 | 8/2012 | Webster |
| 2012/0226759 A1 | 9/2012 | Lew |
| 2012/0297065 A1 | 11/2012 | Leahy |
| 2013/0132809 A1 | 5/2013 | Tseng |
| 2013/0167012 A1 | 6/2013 | Fischer |
| 2013/0185336 A1 | 7/2013 | Singh |
| 2013/0217416 A1 | 8/2013 | Matthews, III |
| 2013/0275228 A1 | 10/2013 | Milazzo |

FOREIGN PATENT DOCUMENTS

| | | |
|---|---|---|
| CN | 102624728 | 8/2012 |
| CN | 103095663 | 5/2013 |
| CN | 103167444 B | 9/2015 |
| JP | 2002183092 | 6/2002 |
| JP | 2004518219 | 6/2004 |
| JP | 2005011355 | 1/2005 |
| JP | 2008003922 | 1/2008 |
| JP | 2011065635 | 3/2011 |
| JP | 201212004 | 6/2012 |
| JP | 2012234269 | 11/2012 |
| JP | 2013008345 | 1/2013 |
| JP | 2013211047 | 10/2013 |
| JP | 2014006602 | 1/2014 |
| KR | 20070106553 | 11/2007 |
| KR | 10-2010-0016604 A | 2/2010 |
| WO | 20000085853 | 2/2002 |
| WO | 2005045591 | 5/2005 |
| WO | 2008131104 | 10/2008 |
| WO | 2012101243 | 8/2012 |
| WO | 2013015968 | 1/2013 |
| WO | 2013153449 | 10/2013 |

OTHER PUBLICATIONS

Supplementary European Search Report for corresponding European application 14868000.2 dated Apr. 7, 2017.

De Keukelaere, F. et al. "Smash: secure component model for cross-demain mashups on unmodified browsers." Proceedings of the 17th International Conference on World Wide Web. 2008.

<http://web.archive.org/web/20131108062432/http://www.openajax.org/whitepapers/OpenAjax%20Hub%202.0%20and%20Mashup%20Assembly%20Applications.php> published on Nov. 8, 2013 as per Wayback Machine.

<http://web.archive.org/web/20131106061828/httpy/www.opentracker.net/products/web-analytics/feature/track-events-properties> published on Nov. 6, 2013 as per Wayback Machine.

<http://web.archive.org/web/20131113073117/https://www.opentracker.net/products/web-analytics/feature/track-unique-visitors> published on Nov. 13, 2013 as per Wayback Machine.

* cited by examiner

SYSTEM AND METHOD FOR THIRD PARTY APPLICATION ACTIVITY DATA COLLECTION

CROSS REFERENCE TO RELATED APPLICATIONS

This application is a Continuation application of U.S. patent application Ser. No. 14/559,943 filed Dec. 4, 2014 which is a Continuation In Part application of U.S. patent application Ser. No. 14/176,166 filed Feb. 10, 2014 which claims priority from U.S. Provisional Patent Application No. 61/762,902, filed Feb. 10, 2013. The application also claims priority from U.S. Provisional Patent Application No. 61/911,485, filed Dec. 4, 2013 all of which are incorporated herein by reference.

FIELD OF THE INVENTION

The present invention relates to on-line applications and their use with contained third party applications in particular.

BACKGROUND OF THE INVENTION

There are many commercially available website building systems and other interactive application building tools that can be used to create and edit websites and other on-line applications. End users can access such websites using client software on a variety of different platforms such as regular personal computers, smart-phones, tablets and other desktop or mobile devices.

These website building systems can come in different configurations such as fully on-line website building systems which are hosted on a server or servers connected to the internet and which are accessed using internet communication protocols such as hypertext transfer protocol (HTTP). The creation, editing and deployment of these website building systems are all performed on-line working directly with the servers.

Website building systems can also be partially online or sometimes even fully offline. For a partially online system, the web site editing is performed locally on the user's machine and is later uploaded to a central server or servers for deployment. Once uploaded, these website building systems behave in the same way as the full on-line website building systems.

Website building systems have internal data architecture in order to organize data and elements within the system. This architecture may be different from the external view of the site in question as seen by the user and may also differ from the way typical hypertext markup language (HTML) pages are sent to the browser. For example, the internal data architecture can contain additional properties for each element on the page (creator, creation time, access permissions, links to templates etc.) which are essential for editing and maintaining the site within the website building system, but are not externally visible to the end-user (or even to some editing users). A typical architecture for a website building system based site may consist of pages containing components (e.g. shape components, picture components, text components, single- and multi-page containers containing mini-pages, etc.)

Components may be content-less such as a star-shape which does not have any internal content (through it has color, size, position and some other attributes) or may have internal content, such as a text paragraph component, whose internal content includes the displayed text, as well as font, formatting and layout information. This content may, of course, vary from one instance of the text paragraph component to another.

A designer using such a website building system may design a new creation from scratch (starting with a blank screen), or may rely on predefined application templates created by the designer himself or herself, by the system creator, or by the designer community. The website building system may support templates which are mere component collections, complete pages (or mini pages) or even sets of pages and complete web sites.

When an application template is provided, the designer can customize it at will—adding, removing or modifying all elements of the template to create his or her version of the template. Such customization may be implemented by creating a modified version of the template (which is distinct and separate from the template). Alternatively, the website building system may apply the customizations through an inheritance-type mechanism which retains the link to the original template, and would thus reflect later changes made to the template.

Website building systems can also be extended using third party applications and components embedded in them. Such third party applications may be included in the website building system design environment or may be purchased (or otherwise acquired) separately through a number of distribution mechanisms, such as from an application store (AppStore) integrated into the website building system, or from a separate, web-based or standalone application repository (or AppStore) operated by the website building systems (WBS) vendor or by another entity. Third party applications may be also be obtained directly from the third party application vendor (through an AppStore or not)—which would provide an actual installation module, or just an activation or access code.

A third party application may include any combination of front-end (display) elements with back-office elements (which are not a part of the visual web site display). The third party application may be entirely back-office (i.e. include no display element), entirely front-end (i.e. be activated only within the context of web site use) or be a combination of the two.

The back-office element of the third party application may include functions such as data-base communication, external update options etc. For example, a blog third party application might include a back-office element which allow updates to be received from non-human sources (e.g. a RSS news feed from a major news service), as well as from human sources not related to the web site (e.g. a stand-alone smart-phone application which allows submission of blog entries).

The integration of the visual element of a third party application into the containing web site can be done in a number of ways. Widget-type third party applications can be embedded inside a web site page as a component whereas section-type third party applications can be added to the web site as an additional page or pages.

Furthermore third party applications (both widget and section) can be single-page third party applications or multi-page third party applications (which have internal mini-pages represented as an internal URL structure). A system may implement any or all of the four possible combinations (widget or section, single-page or multi-page).

Multi-page third party applications usually provide a default "landing" mini-page, which could be an opening page, a specific internal mini-page (e.g. the most recent blog entry in a blog third party application), a mini-page selection screen or some other mini-page.

The use of third party applications in website building system-based web sites is done through third party application instances. The website building system may support multiple uses of third party applications at a number of levels, such as allowing a single third party application instance in the entire web site; allowing instances of multiple third party applications to be created inside the web site (but not more than one instance of any given third party application) and allowing multiple instances of multiple third party applications to be created, but no more than one instance per a given page. It may also allow multiple instances per page of component third party applications but not of section third party applications and may also allow multiple instances of multiple third party applications to be created without any limitations on the amount, multiplicity or location of the third party applications instances.

The third party application instance may have instance-specific content. For example, an e-Shop third party application may have a product database associated with the specific instance, which is different from the product database associated with other instances of the same e-Shop third party application (in the same site or other sites).

For the purposes of discussion, the web site page (or mini-page) containing the third party application and its mini-pages or elements (i.e. the "wrapper page") shall be known as the containing web page and to the entire web site as the main site. The integrated page shown to the user— including the main page and an embedded TPA mini-page/component—shall be referred to as combined page. For section type third party applications, the "virtual page" containing the third party application would serve as the containing web page.

Third party applications are usually deployed either on the website building system vendor servers, on the third party application vendor server, on external (4th party) servers, or any combination thereof. A third party application may also include elements actually running on the end user machine, such as a statically-installed browser extension or a dynamically run JavaScript component running inside the website building system client-side code as is illustrated in FIG. 1 to which reference is now made.

The website building system vendor's servers act as a contact point for the end-user, and responds to requests (possibly connecting to the third party applications vendors' servers to receive required information). The website building system may create direct connections (as required) between the client computer and the third party application vendors' servers, for example when video streaming is required.

Included third party application instances may have their own internal content, similar to the way in which regular components include internal content. The third party application may manage this content independently of the website building system and of the website generated using the website building system as is illustrated in FIG. 2 to which reference is now made. Multiple third party application instances (of single or multiple third party applications) may have shared content, e.g. two e-Shop instances in two separate web site pages may refer to the same product database.

The output from included third party applications may be integrated into the containing web page in a number of ways, such as:

Server Side Processing: in this alternative as is illustrated in FIG. 3 to which reference is now made, third party application [a] (including design and display elements) and the user-specific third party application data [b] are merged by the third party application server code [c] running on the third party application vendors' server [d]. They are sent over the communication medium [e] to the website building system server code [f] which merges them with the containing web page information [g] and then sends them for display on the user client station [h].

Client-Side Processing: in this alternative as is illustrated in FIG. 4 to which reference is now made, third party application [a] (including design and display elements) and the user-specific third party application data [b] are merged by the third party application server code [c] running on the third party application vendors' server [d]. They are sent over the communication medium [e] to a client side processing component [h]. The website building system server code [f] sends the containing web page information [g] to this client side processing component [h]. The client side processing component [h] performs the merging of the two source of information and presents a unified application to the browser (or other client agent) [i].

iFrame Inclusion: in this alternative as is illustrated in FIG. 5 to which reference is now made, the third party application [a] (including design and display elements) and the user-specific third party application data [b] are merged by the third party application server code [c] running on the third party application vendors' server [d]. They are sent over the communication medium [e] to a browser-based application [h] running inside the user agent (e.g. a web browser) [i]. The website building system server code [f] sends the containing web page information [g] to this browser-based application [h]. The containing web page is realized as a web page which contains one or more iframe directives which include the content from the third party application server [d]. Additional and alternative methods may be applicable as well.

SUMMARY OF THE PRESENT INVENTION

There is provided in accordance with a preferred embodiment of the present invention, a system implementable on a website via a client/server system having at least one processor to process instructions defining the system. The system includes at least one hub to coordinate at least one activity message between the website and at least one third party application where the at least one activity message has a standardized format. The system also includes an activity coordinator to listen to the at least one activity message and at least to add data extracted from the at least one message to a stream associated with at least one of an identified contact and an anonymous contact and where the at least one of an identified contact and an anonymous contact is a user of the website. The system also includes a contacts coordinator to retrieve and analyze contact related information from the stream and to enrich previously held information for the contact and at least one database to store the activity streams and the contact related information for use by the web site and by the contact.

Moreover, in accordance with a preferred embodiment of the present invention, the at least one hub includes at least one of: a router and tracker to route and track the at least one activity message between the website and the at least one third party application, a private policy enforcer to enforce privacy policy between the website and the at least one third party application, a translator and adapter to apply pre-specified at least one message translation and content adaptation rules between the website and the at least one third party application, a private data proxy to implement at least one of a private data proxy and private data replacement and to enforce user permission field limitations between the website and the at least one third party application and a validator and signer to validate the signature of the at least one activity message using the incoming key of the at least one third party application, to translate the external ID associated with the at least one activity message with an internal website ID and to sign an outgoing at least one activity message using the outgoing key of the at least one third party application.

Further, in accordance with a preferred embodiment of the present invention, the activity coordinator includes at least one of a stream creator to identify the contact associated with at the at least one activity message and to create the stream of data if no associated contact exists, a stream merger to merge data from the at least one activity message to an existing stream and data from at least two of the activity streams into a single stream and a log creator to log activity data from the activity stream into the at least one database.

Still further, in accordance with a preferred embodiment of the present invention, the contacts coordinator includes at least one of: a data extractor to extract contact related information from at least one of the at least one activity message, the stream, other contacts and external sources, a data merger to merge at least two contact information records where the records have an association with the same identified contact and to merge the extracted contact related information to that of an existing contact according to predefined merging rules, a contact handler to create at least one of an identifiable new contact and an anonymous contact and to track contact activity during a session of the website and a data and permissions handler to handle the privacy protection and permissions of extracted contact related information.

Additionally, in accordance with a preferred embodiment of the present invention, the router and tracker supports routing of the at least one activity message using at least one third party application specified listening queries.

Moreover, in accordance with a preferred embodiment of the present invention, the stream merger includes an activity-to-stream merger to merge the data into the stream associated with the identified contact and a stream-to-stream merger to merge at least two separate streams into a single stream.

Further, in accordance with a preferred embodiment of the present invention, the stream-to-stream merger includes at least one of a horizontal stream merger to merge the at least two separate streams according to a identified common contact and a vertical stream merger to merge a stream created for an anonymous contact with a stream associated with a registered contact user upon a login or registration which may connect the two.

Still further, in accordance with a preferred embodiment of the present invention, the data merger includes at least one of: a contact identifier at least one of: locate identical primary ID field values in at least two of the contact information records, locate primary key field values within in least two of the contact information records which are identical when normalized, identify site users using a cookie, identify a site user using site login for registered users and identify a site user through a social login for site users with an account associated with a social network. The data merger also includes a uniter to unite contact information using at least one of linguistic, syntax, text analysis and consultation with external data sources and services, a contradiction resolver to resolve contradictions between contact records according to predefined rules, a list value creator to create list value fields to define a clear precedence between the contact records, a horizontal contact merger to merge two unrelated contacts due to a detected common primary ID and a vertical contact merger to merge an anonymous contact with a contact associated with a registered user upon login or registration which may connect the two.

Additionally, in accordance with a preferred embodiment of the present invention, the horizontal contact merger includes a virtual merger to maintain at least two contact records as separate and to link them together so they are marked as representing the same contact.

Moreover, in accordance with a preferred embodiment of the present invention, the vertical contact merger includes a virtual merger to maintain an anonymous contact and a contact associated with a registered user as separate and to link them together so they are marked as representing the same contact.

Further, in accordance with a preferred embodiment of the present invention, the user permission field is at least one of the website determined and the website owner determined.

Still further, in accordance with a preferred embodiment of the present invention, the standardized format is at least one of defined by a predefined schema, inheritance, a call back link, encoded and defined by the at least one third party application or based on external formal, industry or de-facto standard.

There is provided in accordance with a preferred embodiment of the present invention, a method implementable on a website via a client/server system having at least one processor to process instructions defining the method. The method includes coordinating at least one activity message between the website and at least one third party application where the at least one activity message has a standardized format, listening to the at least one activity message and at least adding data extracted from the at least one message to a stream associated with at least one of an identified contact and an anonymous contact and where the at least one of an identified contact and an anonymous contact is a user of the website. The method also includes retrieving and analyzing contact related information from the stream and enriching previously held information for the contact and storing the activity streams and the contact related information for use by the website and by the contact.

Moreover, in accordance with a preferred embodiment of the present invention, the coordinating includes at least one of: routing and tracking the at least one activity message between the website and the at least one third party application, enforcing privacy policy between the website and the at least one third party application, applying pre-specified at least one message translation and content adaptation rules between the website and the at least one third party application, implementing at least one of a private data proxy and private data replacement and enforcing user permission field limitations between the website and the at least one third party application and validating the signature of the at least one activity message using the incoming key of the at least one third party application, translating the external ID associated with the at least one activity message with an internal the website ID and signing an outgoing at least one activity message using the outgoing key of the at least one third party application.

Moreover, in accordance with a preferred embodiment of the present invention, the listening and the at least adding include at least one of: identifying the contact associated with the at least one activity message and creating the stream of data if no associated contact exists, merging data from the at least one activity message to an existing stream and data from at least two of the activity streams into a single stream and logging activity data from the activity stream into the at least one database.

Further, in accordance with a preferred embodiment of the present invention, the retrieving and analyzing include at least one of: extracting contact related information from at least one of the at least one activity message, the stream, other contacts and external sources, merging at least two contact information records where the records have an association with the same identified contact and merging the extracted contact related information to that of an existing contact according to predefined merging rules. The retrieving and analyzing also include creating at least one of an identifiable new contact and an anonymous contact and tracking contact activity during a session of the website and handling privacy protection and permissions of extracted contact related information.

Still further, in accordance with a preferred embodiment of the present invention, the routing and tracking supports routing of the at least one activity message using the at least one third party application specified listening queries.

Additionally, in accordance with a preferred embodiment of the present invention, the merging includes merging the data into the stream associated with the identified contact and merging at least two separate streams into a single stream.

Moreover, in accordance with a preferred embodiment of the present invention, the merging the data into the stream associated with the identified contact and merging at least two separate streams into a single stream includes at least one of horizontally merging the at least two separate streams according to a identified common contact and vertically merging a stream created for an anonymous contact with a stream associated with a registered contact user upon a login or registration which may connect the two.

Moreover, in accordance with a preferred embodiment of the present invention, the merging at least two contact information records includes at least one of: locating identical primary ID field values in at least two of the contact information records, locating primary key field values within in least two of the contact information records which are identical when normalized, identifying site users using a cookie, identifying a site user using site login for registered users and identifying a site user through a social login for site users with an account associated with a social network. The merging at least two contact information records also includes uniting contact information using at least one of linguistic, syntax, text analysis and consultation with external data sources and services, resolving contradictions between contact records according to predefined rules, creating list value fields to define a clear precedence between the contact records, horizontally merging two unrelated contacts due to a detected common primary ID and vertically merging an anonymous contact with a contact associated with a registered user upon login or registration which may connect the two.

Further, in accordance with a preferred embodiment of the present invention, the horizontally merging includes virtual merging to maintain at least two contact records as separate and linking them together so they are marked as representing the same contact.

Still further, in accordance with a preferred embodiment of the present invention, the vertically merging includes virtual merging to maintain an anonymous contact and a contact associated with a registered user as separate and linking them together so they are marked as representing the same contact.

Additionally, in accordance with a preferred embodiment of the present invention, the user permission field is at least one of the website determined and the website owner determined.

Moreover, in accordance with a preferred embodiment of the present invention, standardized format is at least one of defined by a predefined schema, inheritance, a call back link, encoded and defined by the at least one third party application or based on external formal, industry or de-facto standard.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
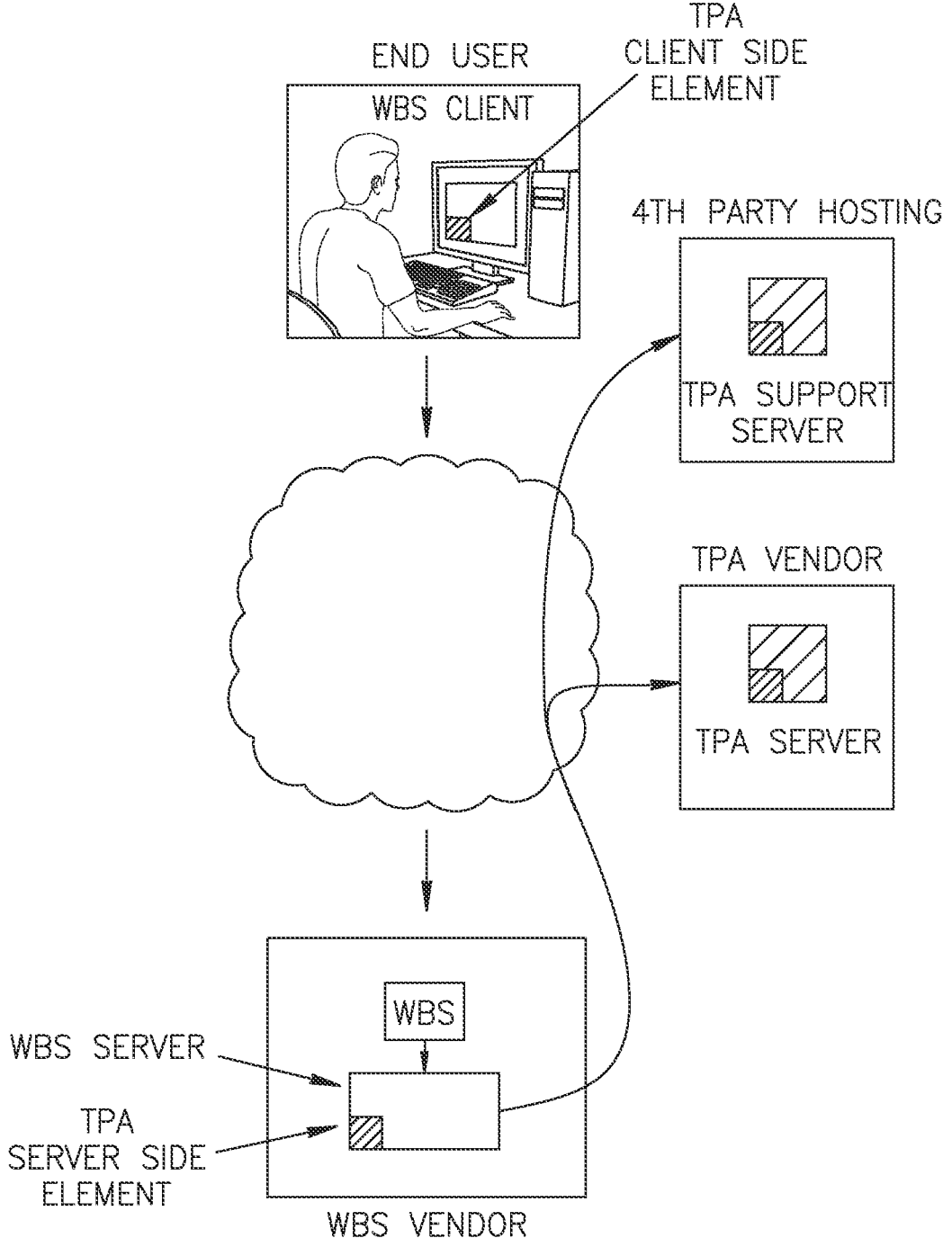
FIG. 1 is a schematic illustration of deployment configurations between a website building system and a third party application.
Figure 2:
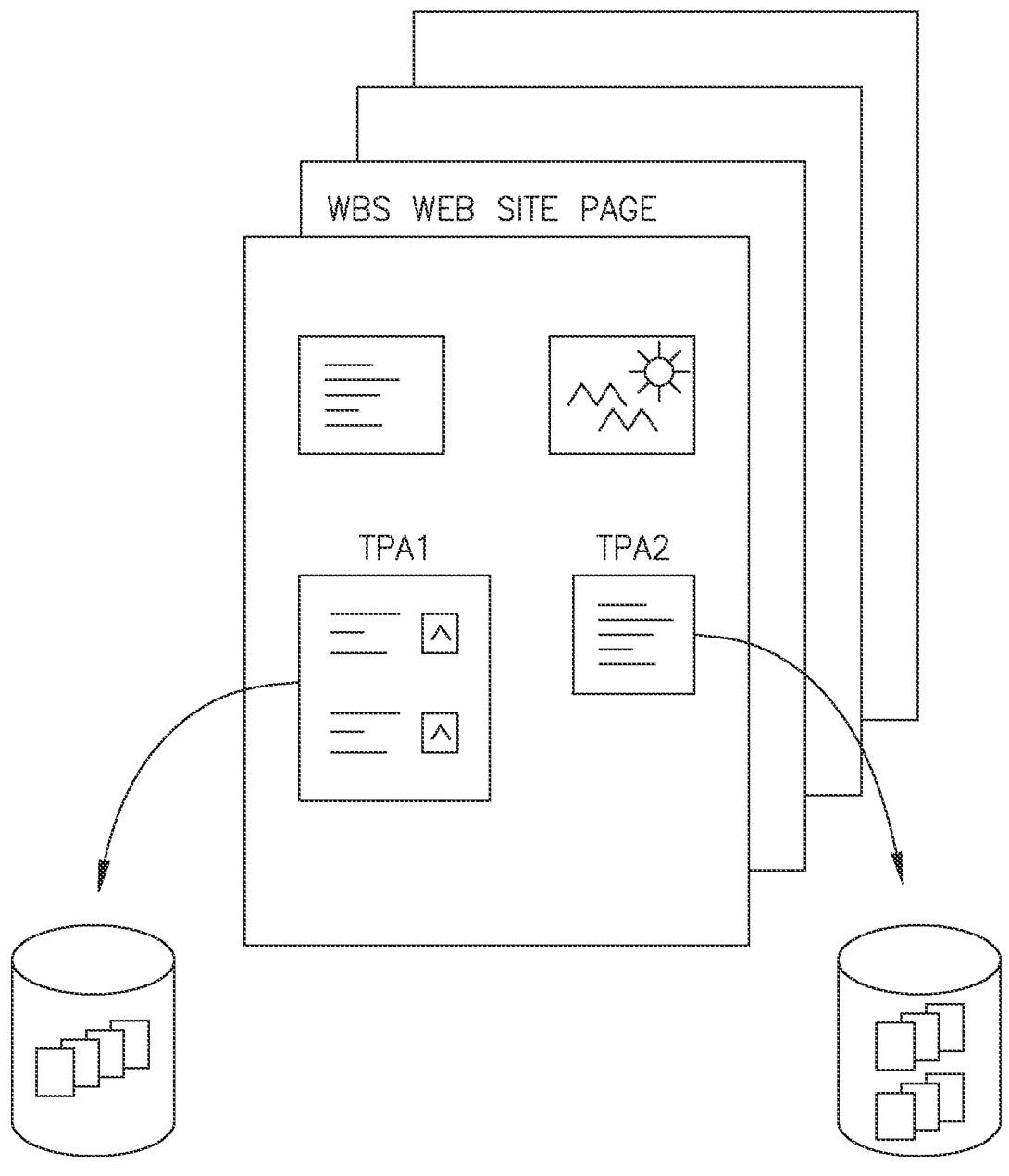
FIG. 2 is a schematic illustration of third party application internal content management.
Figure 3:
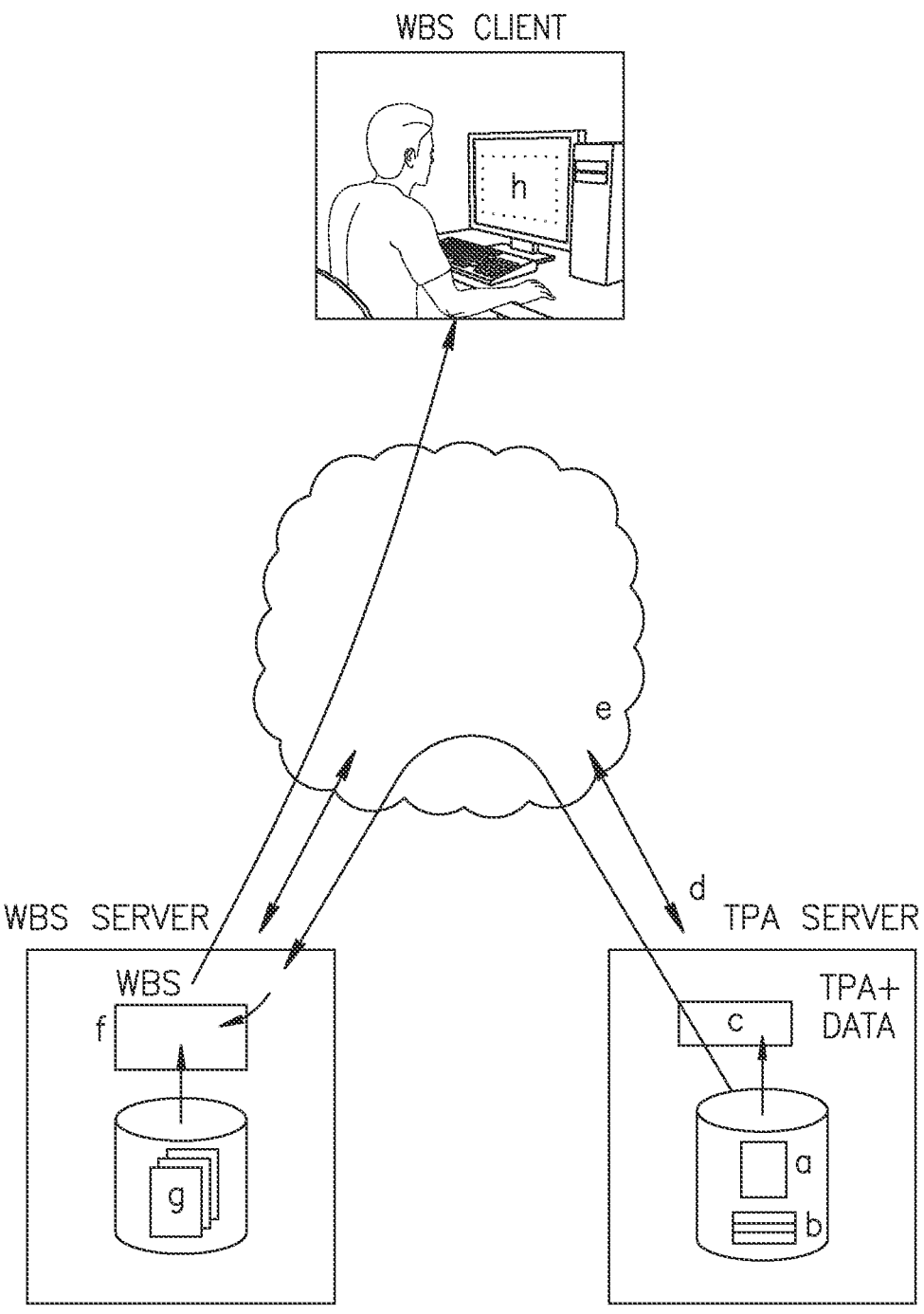
FIG. 3 is a schematic illustration of third party application inclusion in a containing web page through server side processing.
Figure 4:
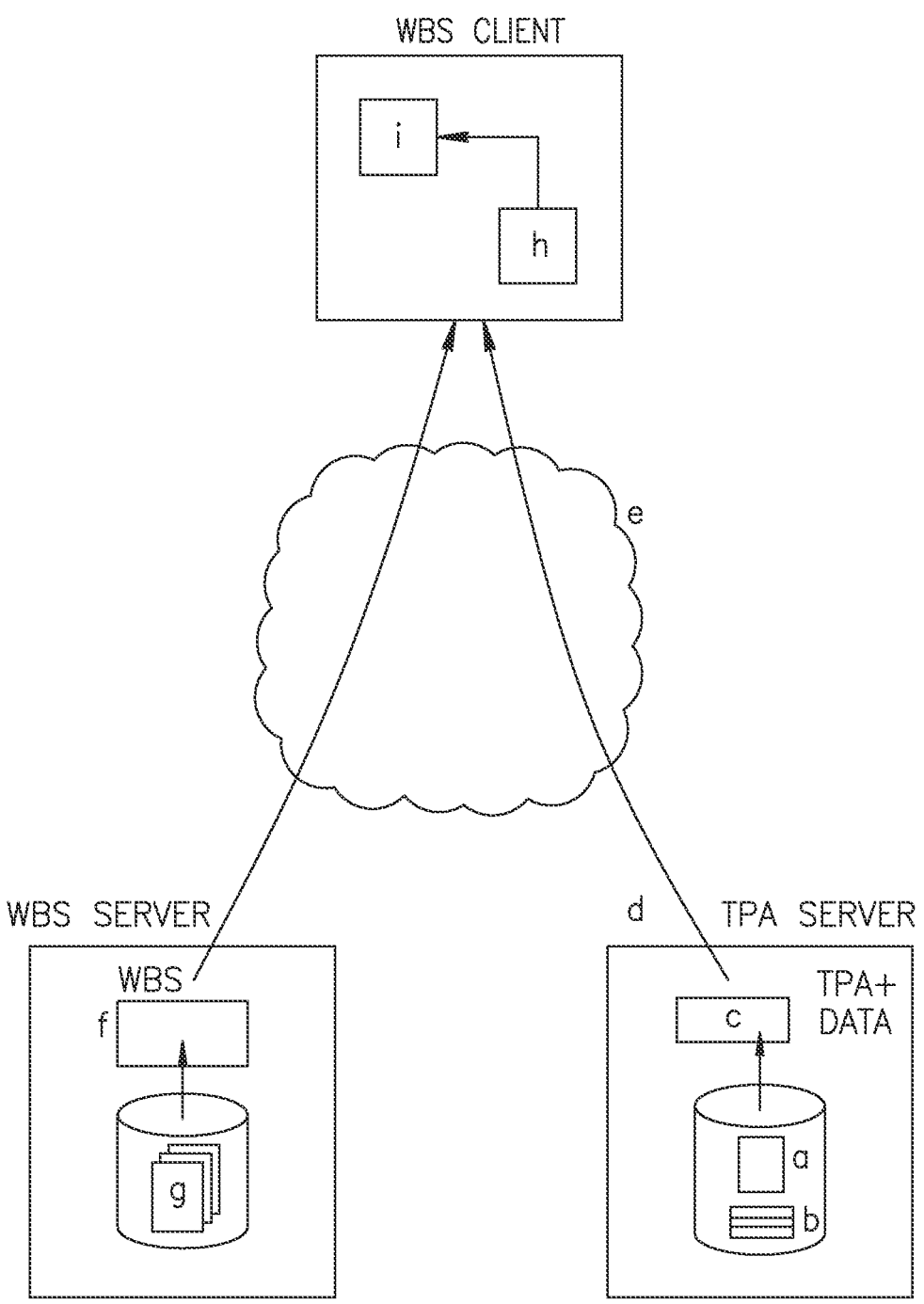
FIG. 4 is a schematic illustration of third party application inclusion in a containing web page through client side processing.
Figure 5:
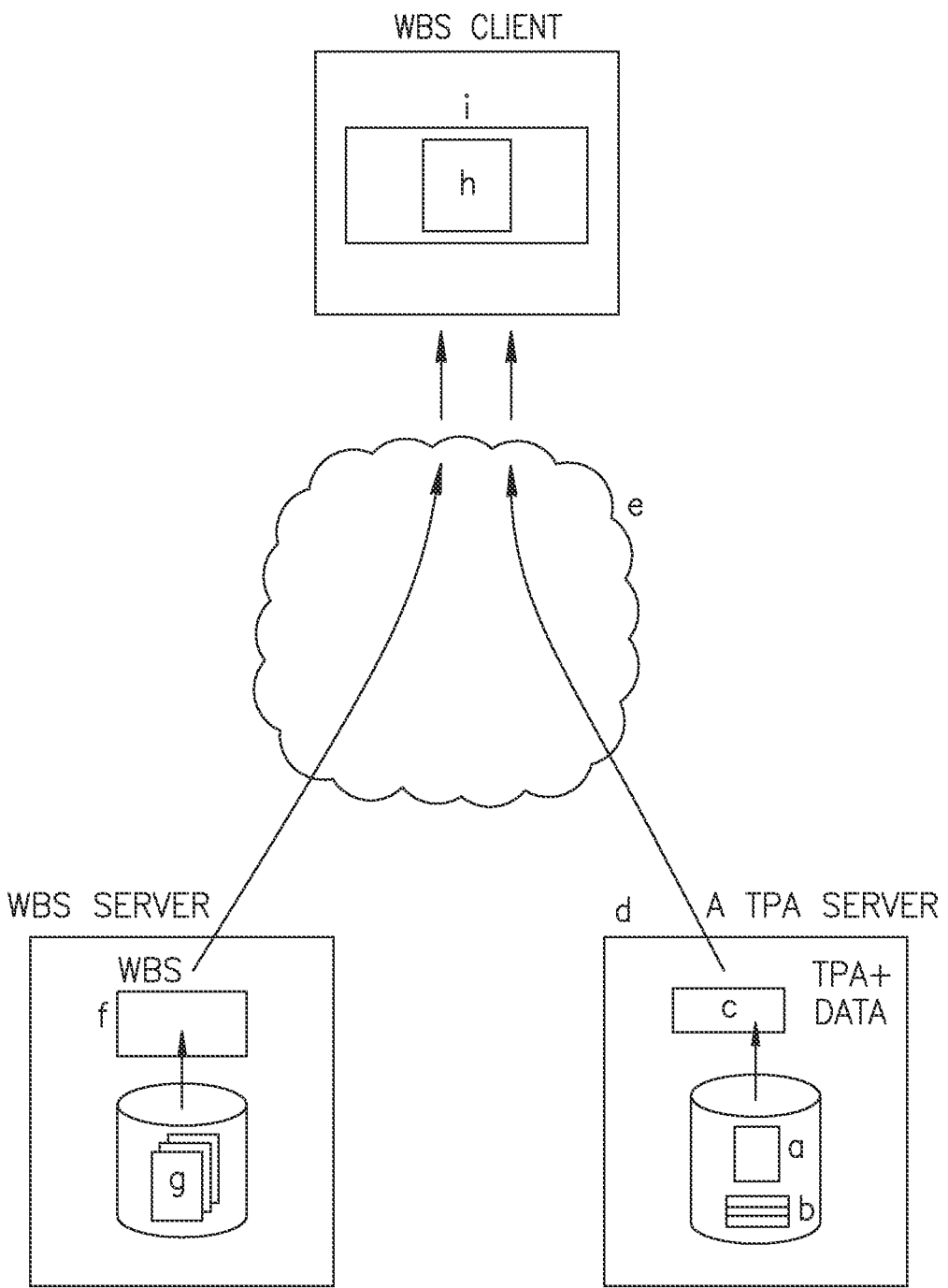
FIG. 5 is a schematic illustration of third party application inclusion in a containing web page through iframe inclusion.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that are numerous limitations of current methods in the way third party applications are typically integrated into web site building systems and in the way in which integrated third party applications and website building systems interact.

These limitations include the third party application display being limited to a single rectangular area inside the containing web page, the area contained in the iframe. They also include the ability of the third party application to control its own windows' size and position, as well as visual elements which are outside the actual third party application display window (e.g. specialized display frames around the third party application window).

The third party application may have its own display styles (color schemes, fonts, character sizes, etc.). These styles may be good for some containing web pages but may be visually problematic or discordant with other containing web pages.

Figure 6:
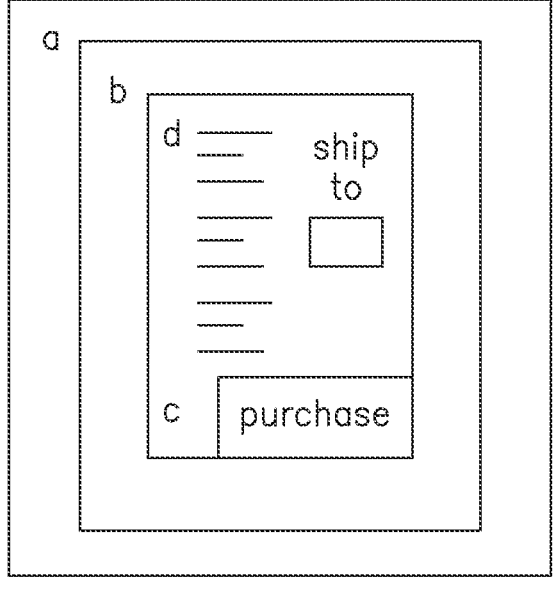
FIG. 6 is a schematic illustration of existing and non-optimal third party application displays during page layout change.
Figure 6:
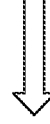
Figure 6:
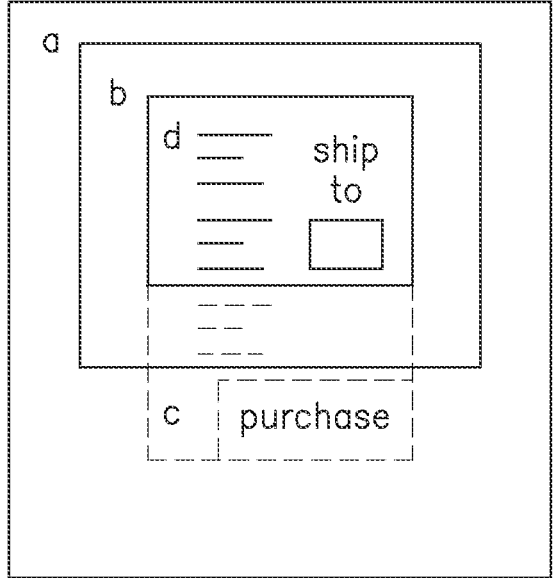

Another limitation is the rigidity of the third party application display from the view point of the containing site. If the site has to be visually modified (e.g. due to deployment to a platform with different screen size or due to dynamic layout event), the containing web page may be required to change the size of the window allocated to the third party application. In such a case, the third party application display would be clipped and would require scrolling via scroll bars to reach different sub-areas in the third party application. Reference is now made to FIG. 6 which illustrates an example of what may happen when containing web page [a] is resized, the area allocated to the e-Shop third party application[b] is reduced, and the "Purchase" button

[c] can't be viewed together with the content of the shopping cart [d]—requiring multiple scrolling actions to complete a purchase, and making it vastly less likely that a purchase would in fact be completed.

It will be appreciated that a third party application cannot interact with other components in the containing webpage and that such an interaction is sometimes required to achieve complex functionality. In particular, there is no way for the third party application to perform differently according to the type and content of the components in the containing web page. An example of this may be a website that streams an online cookery course. The user may wish to have in the background to watching his movie, a small area of his screen dedicated to a feed with news and weather updates in another area of his screen (such as a live stream from CNN). He may wish to automatically pause his learning session when the weather report for his residential area begins.

There is also no clear, standard way for multiple third party applications to cooperate with each other, in particular if they are provided by different vendors. Thus, a designer has no clear way to combine multiple third party applications from different vendors. An example of this may be for an ecommerce website running a module from a third party ordering system and a different module for a shipping system. It may be desirable to order supplies according to the shipping schedule etc.

Applicants have realized that this integration may be achieved by using structured two-way communication channels between the website building system and the third party application instances included in it and between the different third party application instances that may be implemented within the same containing page. These channels may also transfer information concerning layout, style and additional information.

It will be appreciated that the discussion below focuses on the iframe inclusion method, which is the preferred method as it is built into and integrated with modern browsers, and does not require the creation of special integration code. Iframe inclusion also provides browser-supported encapsulation and sandboxing as well as inherent protection against hacking techniques such as cross-site scripting attacks which may be employed by malicious third party applications.

Figure 7A:
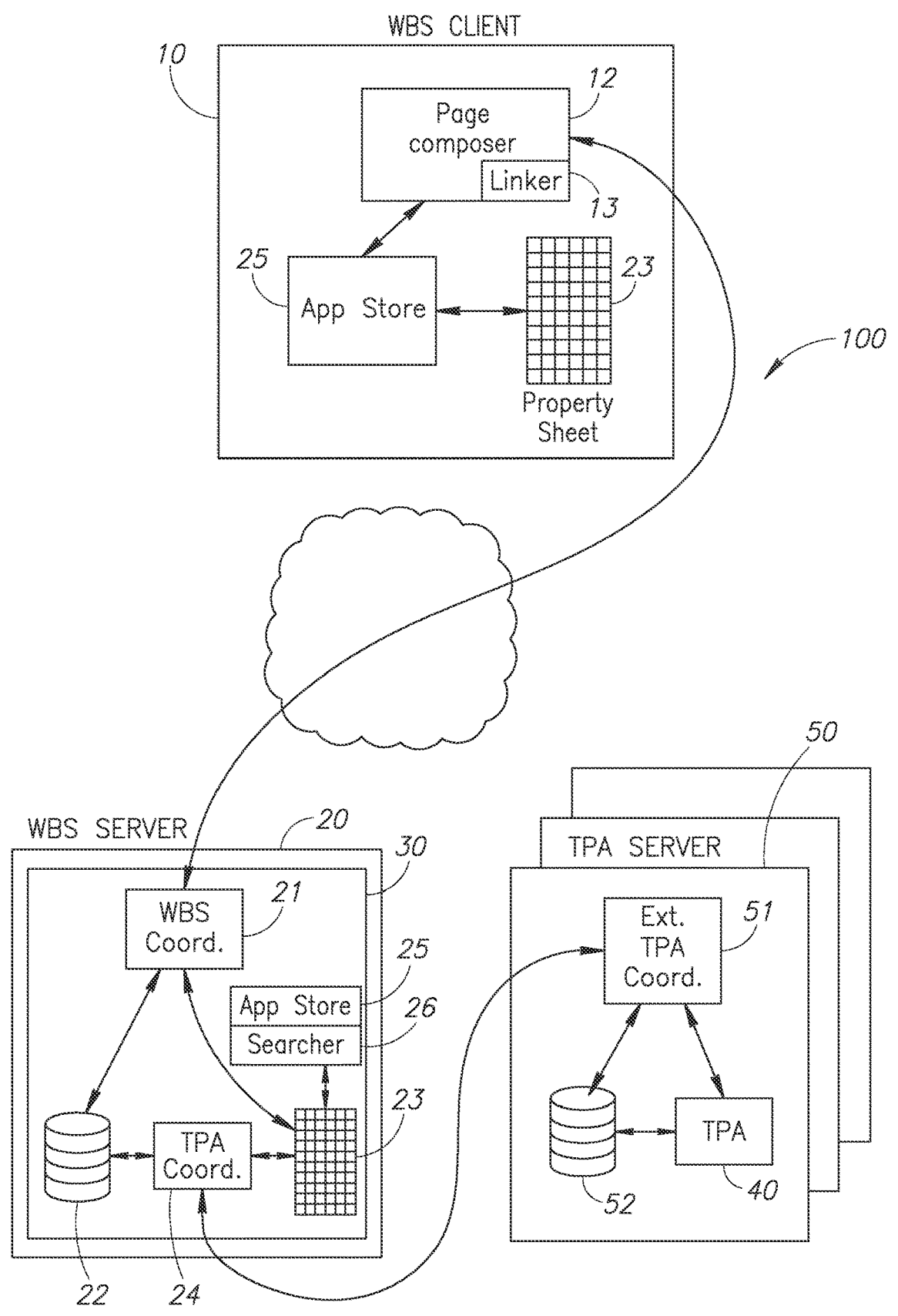
FIGS. 7A and 7B are schematic illustrations of a system for integrating a website building system and one or more third party applications, constructed and operative in accordance with the present invention.
Figure 7B:
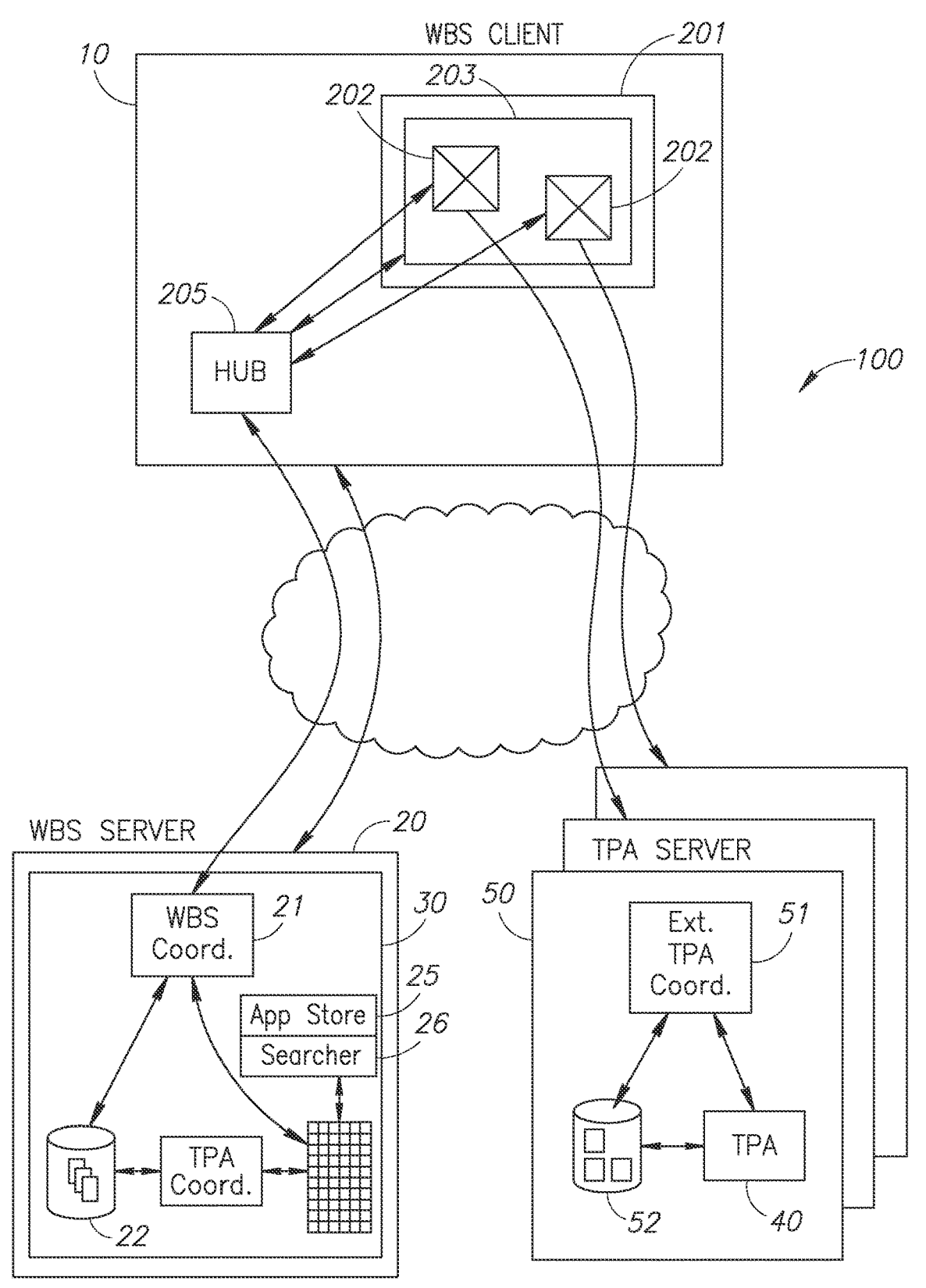

Reference is now made to FIGS. 7A and 7B which illustrate a system 100 for integrating a website building system and one or more third party applications, according to an embodiment of the present invention. FIG. 7A illustrates system 100 at the design stage and FIG. 7B illustrates system 100 at runtime. As can be seen in FIG. 7A, system 100 comprises a client 10, a website building system 30 installed on a website building system (WBS) server 20 and one or more third party applications 40 installed on one or more third party application servers 50. Website building system 30 comprises a WBS coordinator 21, application repository 22, WBS side TPA property sheet 23, third party application (TPA) coordinator 24 and AppStore 25 (which may contain a searcher 26). Client 10 comprises page composer 12 and a client side view of TPA property sheet 23. In some embodiments client 10 may also comprise a client side view of AppStore 25. Page composer 12 comprises a linker 13 described in more detail herein below. Third party server 50 comprises third party application 40, external TPA coordinator 51 and TPA database 52 storing third party application 40 components, templates etc. for use. Note that the system 100 may include multiple third party servers 50 belonging to multiple third party application 40 vendors.

It will be appreciated that TPA property sheet 23 may be invoked when attributes are specified for a given third party application 40 instance. It will be further appreciated that when invoked, TPA property sheet 23 may appear as a client side view of TPA property sheet 23 on client 10. It will also be further appreciated that an off-line embodiment may have its property sheet as part of the installed client software, therefore there would be no TPA property sheet 23 or repository thereof.

It will be appreciated that a designer or end-user 5 sitting at client 10, may create his website (or any other online application) using page composer 12 to create website pages and interactions (inter-page as well as intra-page). Designer 5 may select components, templates etc. that are part of website building system 30 stored in application repository 22 via WBS coordinator 21. Designer 5 may also create a containing web page 203 which embeds third party appli- cation 40 instances from third party applications 40 which may have been pre-bought and whose templates, compo- nents etc. may be stored on application repository 22. In an alternative embodiment, the purchased templates, compo- nents etc. may be stored on TPA database 52 and accessed via external TPA coordinator 51. In yet another embodiment, third party application 40 templates, components etc. may be bought purchased according to need via AppStore 25. Prop- erty sheet 23 may be specified by designer 5 and hold information regarding the third party application 40 instances that have been purchased such as permissions, installation instructions, payment etc. as described in more detail herein below. Designer 5 may also use linker 13 to manually designate any communication channels (if required) between the contained third party applications 40. It will also be appreciated that linker 13 may also allow designer 5 to specify any specific communication connec- tion and rules between the containing webpage being built and the third party application 40 instances that are being contained such as the movie and the CNN news report being shown simultaneously as described herein above. It will be appreciated that the linkage created by linker 13 may be modified through the web site lifetime.

It will be appreciated that designer 5 may acquire a third party application 40 through channels external to AppStore 25 such as an external AppStore operated by the third party application 40 vendor or an external party. In such a case, website building system 30 may register the third party application 40 and its configuration data the first time the third party application 40 is installed in a web site created by designer 5 through website building system 30.

It will be appreciated that in order for linker 13 to provide the ability to setup potential communication channels, third party application 40 needs to be able to properly recognize and identify components in containing web page 203 (with which it would like to communicate)—including other third party application 40 instances. For components based on an associated template (described in more detail herein below), the identification is performed in advance by the third party application 40 vendor. Components in the associated tem- plate may be given specific reference ID's, and these ID's may be used by third party application 40 when communi- cating with them.

It will be further appreciated that for multi-part third party applications 40 (described in more detail herein below), i.e. a single third party application 40 spread over multiple iframes, the multiple parts may automatically know how to communicate with each other.

For containing website page components not included in an associated template (as described in more detail herein below), third party application 40 may include a list of required (mandatory and optional) containing web page 203 components which should exist so it may function. The list may be stored within property sheet 23 and include unique ID's, description and component details (e.g. must be a text component, would be used as blog talkback label). The list may be detailed in the third party application 40 entry into AppStore 25, and designer 5 may use linker 13 to specify components (fields) in containing web page 203 conforming to the third party application 40 requirements. It will be appreciated that website building system 30 may dynami- cally create missing containing web page 203 components when the third party application 40 instance is created, and may allow designer 5 to move, resize and fully specify them later.

Alternatively, website building system 30 may expose a full or partial component model of containing web page 203 to the third party applications 40 included in containing web page 203. It will be appreciated that this may be a compo- nent model and not the Document Object Model (DOM) of containing web page 203. The containing web page 203 DOM may be far more complicated and detailed than the component model, since the actual containing web page 203 may contain numerous HTML elements—both hidden and visible—which are part of the website building system 30 infrastructure or which support containing web page 203 components. The component model would thus be much simpler.

Figure 8:
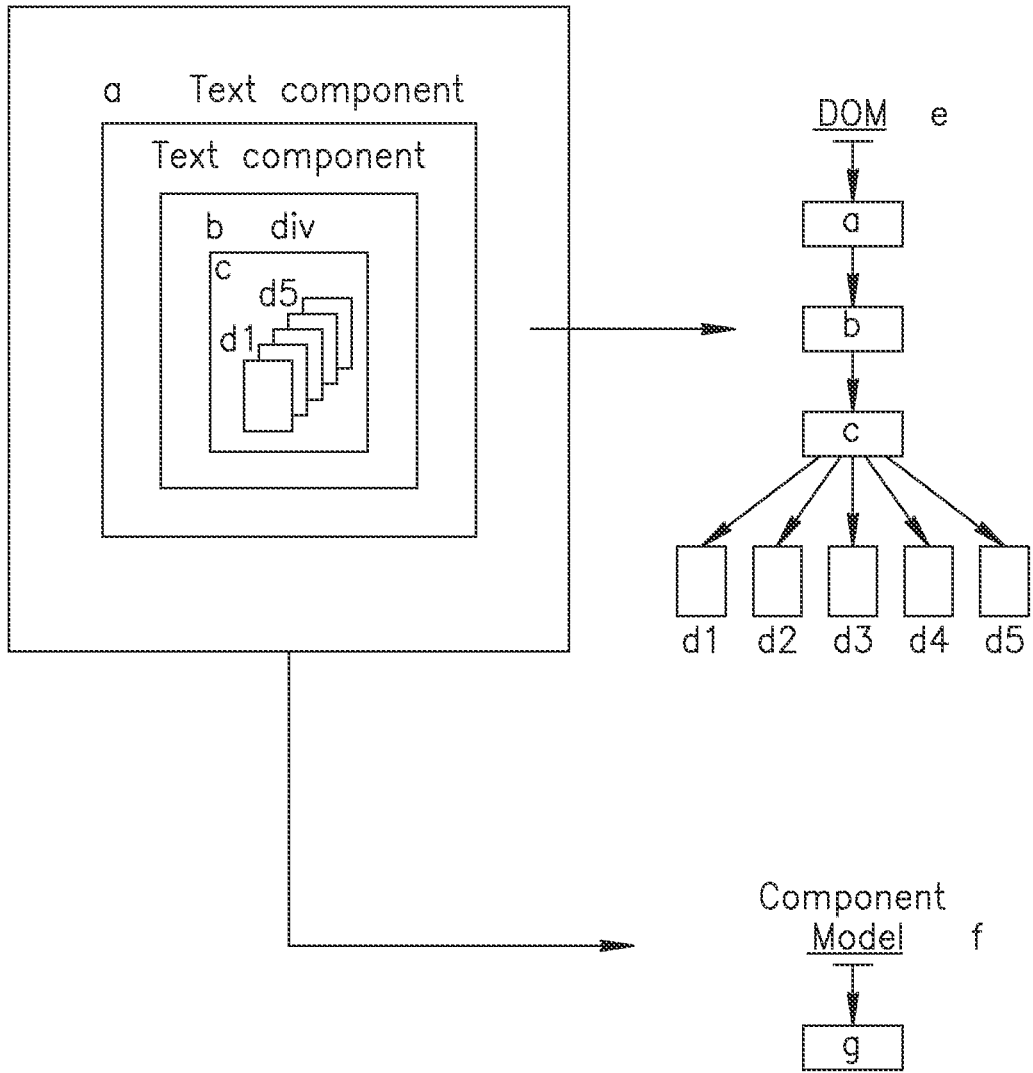
FIG. 8 is a schematic illustration of a document object model compared to a component model.

Reference is now made to FIG. 8 which illustrates how a text component [a] may be implemented using a number of HTML constructs (such as the enclosing div tag [b], internal div tag [c], frame "mini widgets" [d1] . . . [d5] etc.). The DOM model [e] for containing web page 203 may contain separate DOM tree nodes for each of these sub-elements. The component model [f] may be much simpler, containing just a single component node [g].

It will be appreciated that system 100 may also support selective component exposure—designer 5 may designate via linker 13 which components should be exposed to third party application 40, and only these components (possibly including the "containment path" leading to them) may be included in the simplified component model visible to third party application 40. The specification may be performed by explicitly marking the included components, according to their type or any other website building system 30 attribute. Third party application 40 may then traverse the containing web page 203 component model and locate the required components.

It will also be appreciated that links between containing web page 203 and third party application 40 instances may also be created automatically such as broadcast linking in which third party application 40 may send a communication during runtime to record a particular event. This communi- cation maybe optional or mandatory (i.e. the third party application 40 may not function or install unless there is a matching third party application 40 that has been linked to receive such messages). For example, third party application 40 may broadcast information packets about the activities it performs, and any installed logging third party applications 40 may receive these information packets.

The newly created pages which are now complete with settings may be stored in application repository 22 (via WBS coordinator 21) to be called at run-time as described in more detail herein below.

Reference is now made back to FIG. 7B. In this embodi- ment the elements are the same as those in FIG. 7A except for the elements of client 10. During runtime, client 10 comprises viewer 201 to display containing web pages 203. It will be appreciated that viewer 201 may comprise multiple view ports 202, each to display a different instance of third party application 40 (the instances derived from one or more third party application 40). Client 10 also comprises communication hub 205 to promote communication and to provide a back channel between containing web page 203 and any third party applications 40 it is hosting together with any communication that is required between the hosted third party applications 40 without any connection to the pertinent containing web page 203. The functionality of hub 205 will be described in more detail herein below.

It will be appreciated that hub 205 may be implemented on client 10 since containing web page 203 and any third party application 40 inclusions are both interactive parts of the visible web site and their communication should not be delayed by a client-server round-trip. In an alternative embodiment, hub 205 may be implemented on website building system server 20 in the cases where the third party application servers 40 need to exchange a lot of data and it is preferable better not to route them through client 10.

It will be appreciated that communication hub 205 may support different combinations of communication between website building system 30 and one or more third party applications 40 as well as between multiple third party applications 40. For example, hub 205 may enable third party application 40 to request website building system 30 to switch to another page in the main site. Communication hub 205 may also enable a third party application 40 to request to resize its own window possibly affecting the layout of the containing page. This may be done through dynamic layout handling described in more detail herein below. Alternatively, containing web page 203 may request (for example) that the third party application 40 switch to a different version if this is required to accommodate change in the display. It will be appreciated that this 2-way communication may also be initiated between a third party application 40 component and a website building system 30 component related to third party application 40 which displays additional information as well as communication between elements of multi-part third party applications 40 and modular third party applications as described here in above.

It will be further appreciated that system 100 may also be implemented using both an on-line and offline website building system 30, and that it may use any combination of hosting methods, such as client-side elements, website building system 30 vendor servers, third party application 40 vendor servers and other fourth party servers. It will be appreciated that for an offline embodiment as described herein above a server may still be required to implement system 100.

System 100 may also be hosted on a different server set (not operated by the website building system vendor) such as a private site hosting arrangement for a large organization.

System 100 may also support the full gamut of third party application 40 instances inclusion options from third party application 40 as discussed herein above. However, system 100 may also only support a subset of these options or may place a restriction on third party application 40 instance inclusion possibilities.

System 100 may also implement multi-part third party applications 40. A multi-part third party application 40 may include multiple displayed regions, each of which is handled using a separate iframe. These regions may also cooperate (as needed) through communication hub 205 as described in more detail herein below.

Figure 9:
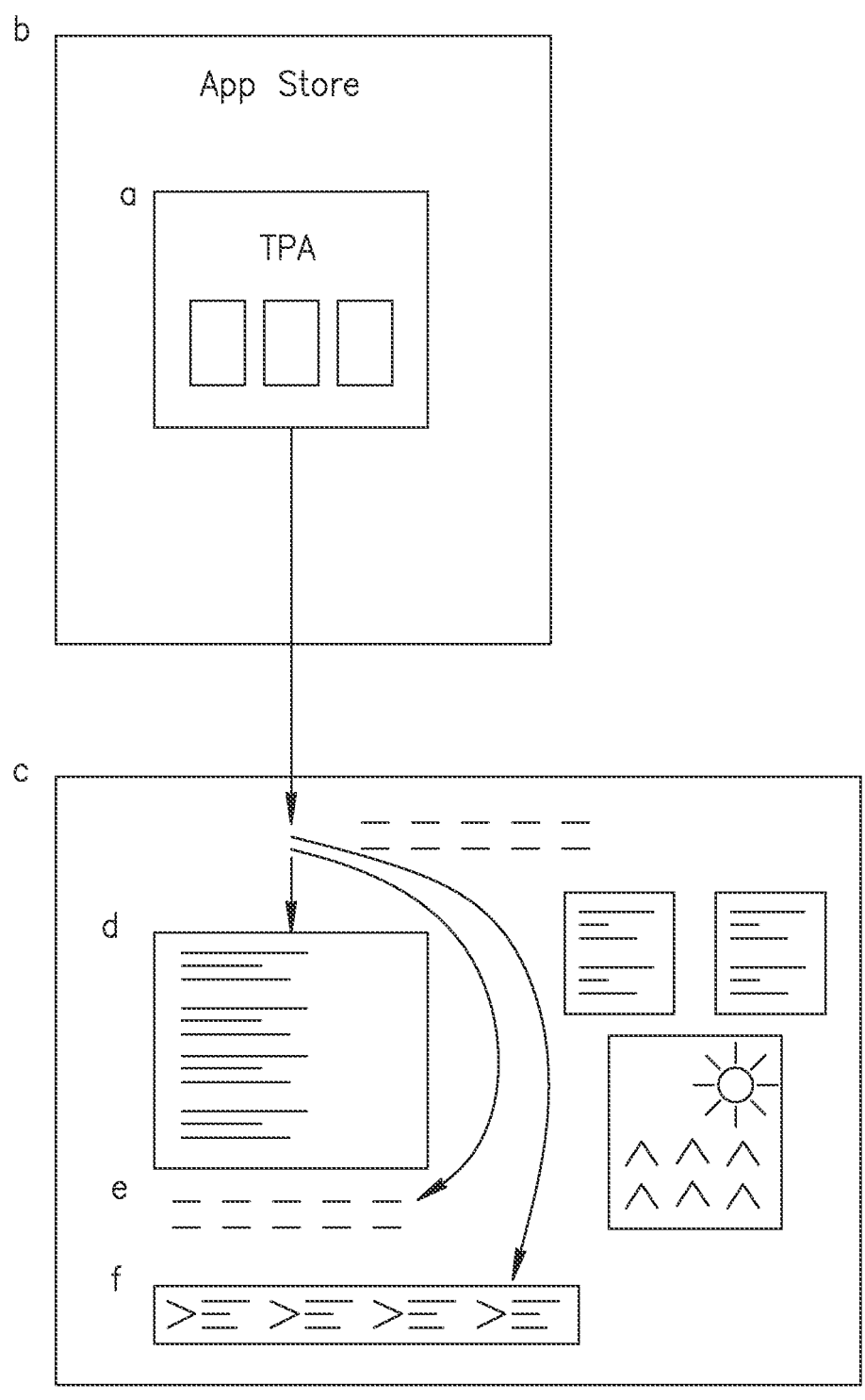
FIG. 9 is a schematic illustration of a sample multi-part blog third party application.

Reference is now made to FIG. 9 which illustrates an example of a multi-part third party application 40. As is shown, a blog third party application [a] acquired from AppStore [b] is placed in containing web page 203 [c]. The blog third party application [a] includes three regions as follows: a blog entry region [d]; a tag cloud region [e]; a news update region [f]. It will be appreciated that a multi-part third party application may use its multiple regions in a number of ways, including as multiple concurrently-resident parts of a single application—as in the blog example above or as multiple optionally-resident parts of a single application—with a number of regions which are always visible and a number of regions which are optional and are only displayed as required. The display of the optional regions may be controlled by third party application 40, or by designer 5 (who decides how to configure the third party application when including it). The display may also be controlled as support functionality regions, such as configuration or extra dialog regions; as an alternative display for a multi-version third party application (e.g. having a small and a large version of the third party application, or having a portrait and a landscape version of the third party application).

It will be appreciated that the above mentioned functionality may be implemented using iframes for third party application 40 element display, thus gaining the encapsulation and security advantages of iframe-based architecture.

It will be further that the implementation of multi-part third party applications 40 requires that third party applications 40 (inside their iframes) may control the display of the various iframes (e.g. their visibility, size and position). It will be further appreciated that communication hub 205 may enable this display as described in more detail herein below.

It will also be appreciated that even when a multi-part third party application 40 consists (visually) of multiple elements and regions, it is still regarded as a single third party application 40 in terms of purchasing (e.g. in AppStore 25), installation, configuration and so on.

In existing systems, each third party application 40 may be considered a separate entity and any cooperation between two third party applications 40 (from the same vendor or otherwise cooperating vendors) has to be developed ad-hoc, on a case by case basis. It will be appreciated that system 100 may also support modular third party applications 40 which consists of multiple cooperating sub-modules which can be purchased and installed separately.

Figure 10:
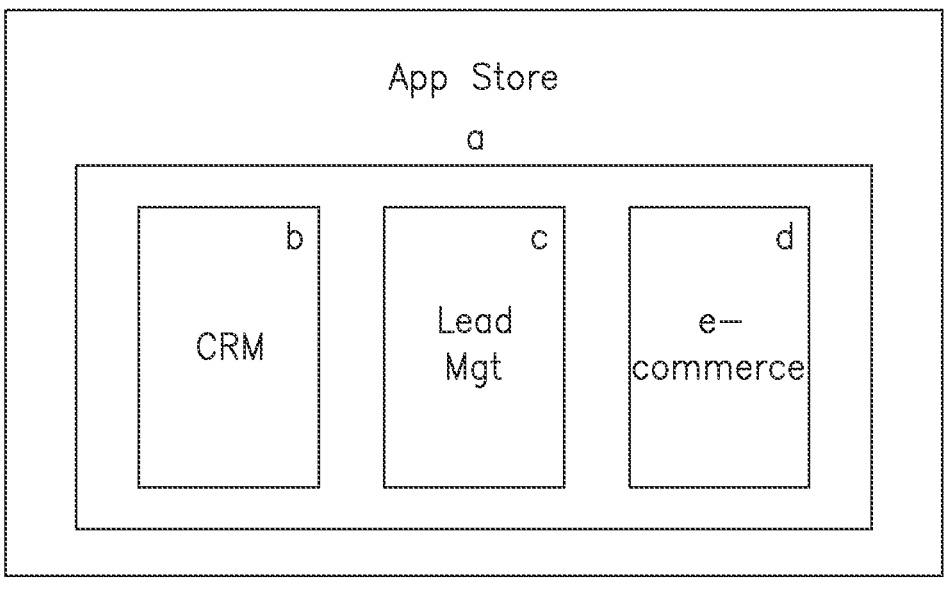
FIG. 10 is a schematic illustration of a sample modular sales third party application.

Reference is now made to FIG. 10 which illustrates how a modular sales management third party application [a] might include the following sub-modules: a CRM module [b]; a lead management module [c] and an e-commerce module [d]; The single third party application vendor may provide all required third party application modules. Alternatively, a third party application vendor may provide a subset of the third party application 40 modules (and functionality) and allow the designer to purchase/install complementary third party application modules from the same or additional third party application vendors. It will be appreciated that whereas a multi-part third party application is acquired and installed as a single third party application from a single vendor, which just happens to occupy multiple screen regions, a modular third party application includes multiple modules which may be acquired and installed separately, and may possible include modules from multiple third party application vendors. To provide the ability to integrate multiple third party application modules from multiple vendors, each third party application module must provide a list of the interfaces/functions it requires, and of the interfaces/functions it provides. This can be done, for example, by using lists of interface names based on hierarchical dot-separated name convention (e.g. My_CRM_T-PA.NewClient.GetInfo) and interface parameter specification.

A third party application 40 module may designate required interfaces as mandatory (i.e. the module will not work without them) or as optional (i.e. the module would work, but may provide reduced or modified functionality). Thus, the parameters provided for each interface are: Interface unique name; interface description—shown to designer 5 so he or she would know (for example) the functionality handled by the missing interfaces; mandatory/optional status; interface parameters list and types. It will be appreciated that each third party application module still resides in a separate iframe (or set of iframes). The operation of the interfaces is based on the communication channels described in more detail herein below.

It will be appreciated that the third party application 40 modules may be assembled during the website design stage. Website building system 30 may resolve the interface references as additional third party application 40 modules are added—with new third party application 40 modules resolving existing required interfaces but possibly adding new (unresolved) required interfaces.

It will also be appreciated that designer 5 may edit and run the complete web site while mandatory (and optional) interfaces are still unresolved. However, designer 5 may not publish the created web site until all mandatory interfaces are resolved, and will be prompted if attempting a function which may require hub 205 to activate a third party application module which still has unresolved mandatory interfaces.

It will be further appreciated that AppStore 25 may comprise a searcher 26 which may attempt to locate third party application 40 modules that resolve required third party application 40 module interfaces. Searcher 26 may search based on unresolved interfaces for a specific third party application 40 module(s) or for all third party application 40 modules. Searcher 26 may also search on currently unresolved interfaces or even on already resolved interfaces as well as search on mandatory, optional or both types of interfaces. It will be appreciated that searcher 26 may also be limited to resolving specific third party application 40 unresolved interfaces and to searching for specific third party application 40 vendors. Searcher 26 may either perform a first level search (i.e. modules satisfying currently unresolved interfaces) or a multi-level search (i.e. perform a repeated search, also looking for modules satisfying unresolved interfaces added when taking into account third party application 40 modules found by the previous search round).

System 100 may use the interface descriptions to provide information to designer 5 on the significance of proceeding with some missing interfaces. Hub 205 may provide interface translation between non-compatible third party applications 40 which still need to communicate. This can be done by an adapter module added by the website building system 30 provider or by an external party which adapts a given required interface to a different format.

System 100 may also be applied to on-line application editing systems, which use the Internet (or any other network connection) and use non-browser client-side software to view the created on-line application. Such a system does not need to use the specific technologies (e.g. IP communication, HTTP, HTML etc.) in use by the regular web infrastructure.

It will be appreciated that standard cross domain communication methods known in the art may be used to facilitate cross-domain communication. These methods may include:

HTML5 PostMessage. This is a standard HTML5 feature which can be used to provide safe cross-domain messaging. Using the HTML5 Windows.Postmessage, messages can be safely sent between windows, iframes and the main HTML document even when residing in different domains. PostMessage provides the tools for the sending iframe to specify the domain to which the message would be sent, and for the receiving iframe to verify the domain from which the message was sent.

URL Fragment Identifier for Messages: This method relies on using the URL fragment identifier to send message data from one end-point to another end-point. The data is encoded in plain text and added (as fragment identifier) to a URL which is used to call a service on the target end-point domain or a hidden iframe inside the target end-point iframe. The fragment identifier is then decoded by the code in the target service or iframe.

Specialized Communication Web Service Website building system 30 provides a specialized web hosted on the website building system server 20. Various communication end-points connect to this server—either to send a message or to check for waiting messages. This can be done via methods known in the art such as the pre-HTML5 Comet set of technologies, the HTML5-based WebSockets, or any other queuing, polling, server push or similar techniques.

HTML5 Local Storage: HTML5 provides a structured local storage facility, which can be used to store queued messages. However, local storage can only be accessed by web content belonging to the same domain as the storing iframe. Solutions have been developed in the art, such as the underlying technique used by the Meebo XAuth product—now owned by Google Inc.—in which a small server provides the support for creating the required intermediate iframe which allows the domain-specific local storage to be accessed from iframes based in foreign domains.

HTML5 Local File System Access Application Programming Interfaces (APIs). Similar to the use of local storage described above, a cross-iframe communication channel may be constructed using local files on the local storage of the user agent accessed through the HTML5 file access API's (File API, FileWriter API and FileReader API). Note however that the sandboxed local file system created by HTML5 file system access API's is still origin-private, and thus an intermediate iframe/server component would be required to bridge the same-origin limitation.

Specialized Browser Plug In: A specialized browser (or other user agent) plug-in can be created to manage the cross-iframe message queue. Such a plug-in would have to be installed by users of website building system 30 (at all levels), and would provide the necessary services to all iframes and main website building system 30 pages.

It will be appreciated that communication hub 205 may act as a broker for all inter-iframe communication using any of the transport methods discussed herein above. It will be further appreciated that hub 205 may be fully aware of containing web page 203 structure and the third party application 40 details as provided by the third party application 40 vendor and stored in property sheet 23. Third party application 40 may also have different parameters when included in different applications and for different instances of inclusion within the same application (as described herein above). Such parameters may include a unique instance name which may be used for smart addressing (described in more detail herein below). It will also be appreciated that hub 205 may also be aware of additional third party application 40 details that may be not be stored in property sheet 23.

It will also be appreciated that hub 205 may also facilitate smart addressing and identification, verify communication origins, enforce communication policy, resolve third party application 40 non compatibility issues and also redirect from third party applications 40 to components. Hub 205 may also enable dynamic updates of layout in third party application 40 based on changes made to containing web page 203 as described in more detail herein below.

Figure 11A:
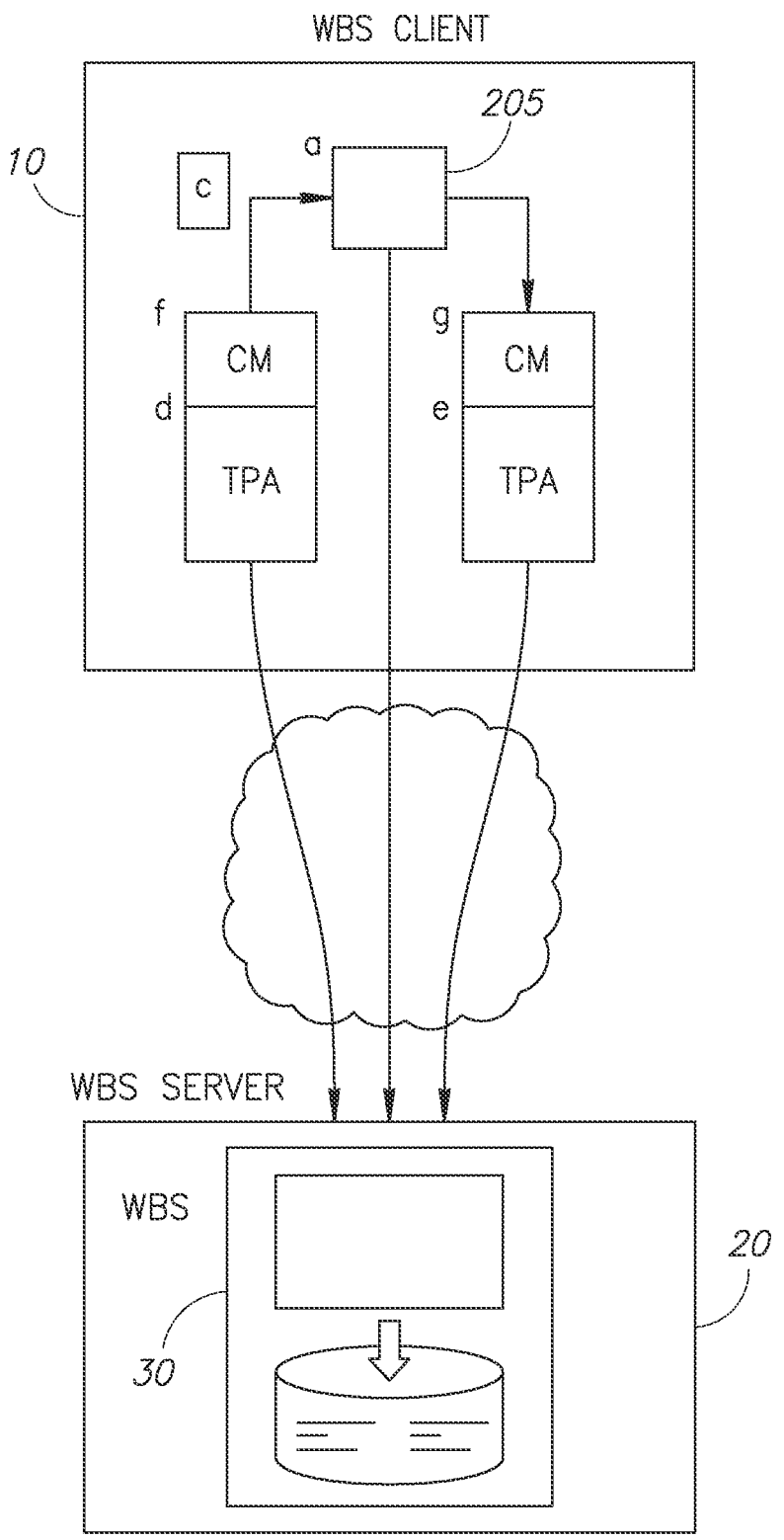
FIGS. 11A and 11B are schematic illustrations of different implementations of a communication hub, constructed and operative in accordance with the present invention.
Figure 11B:
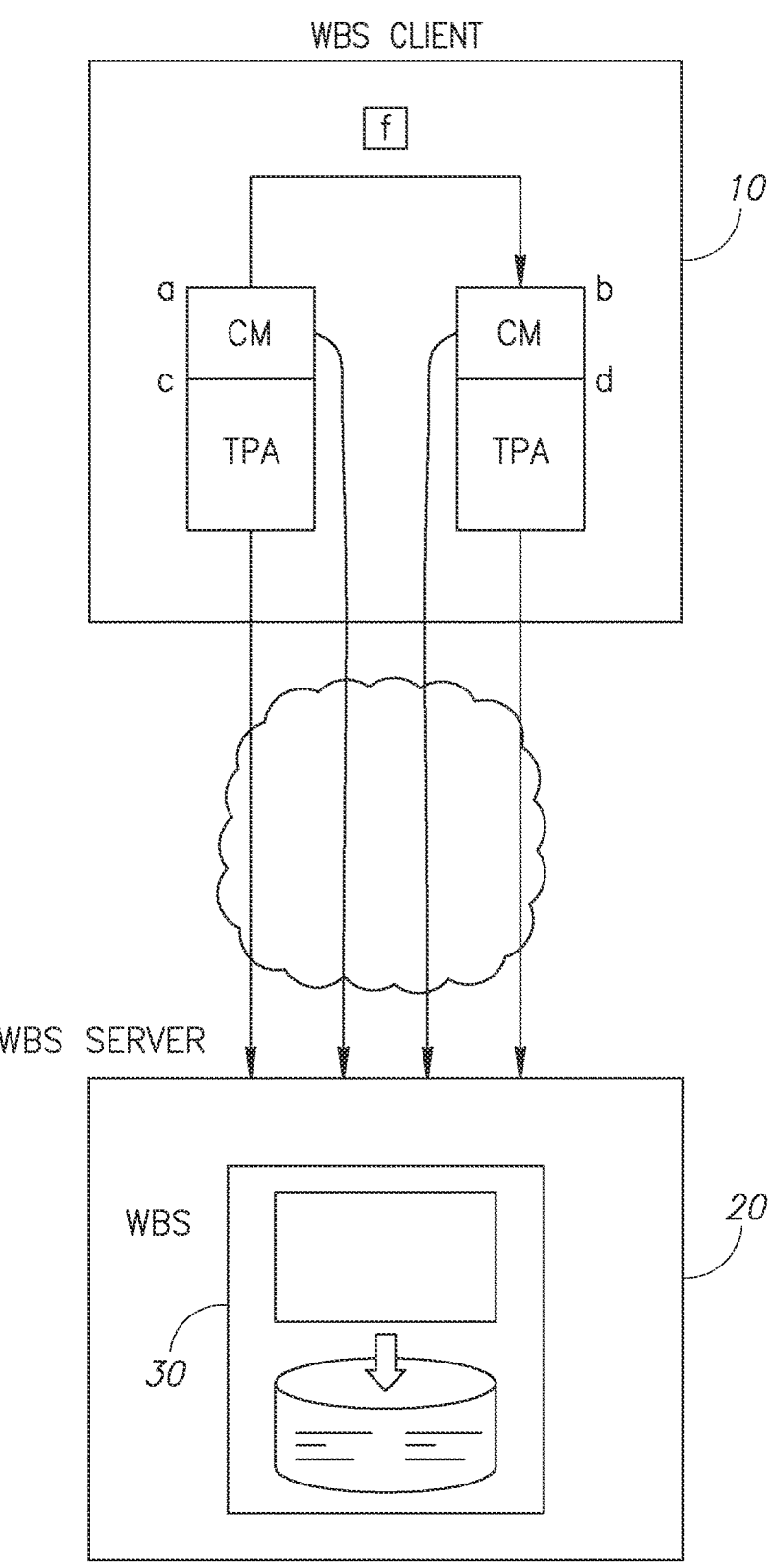
Figure 11C:
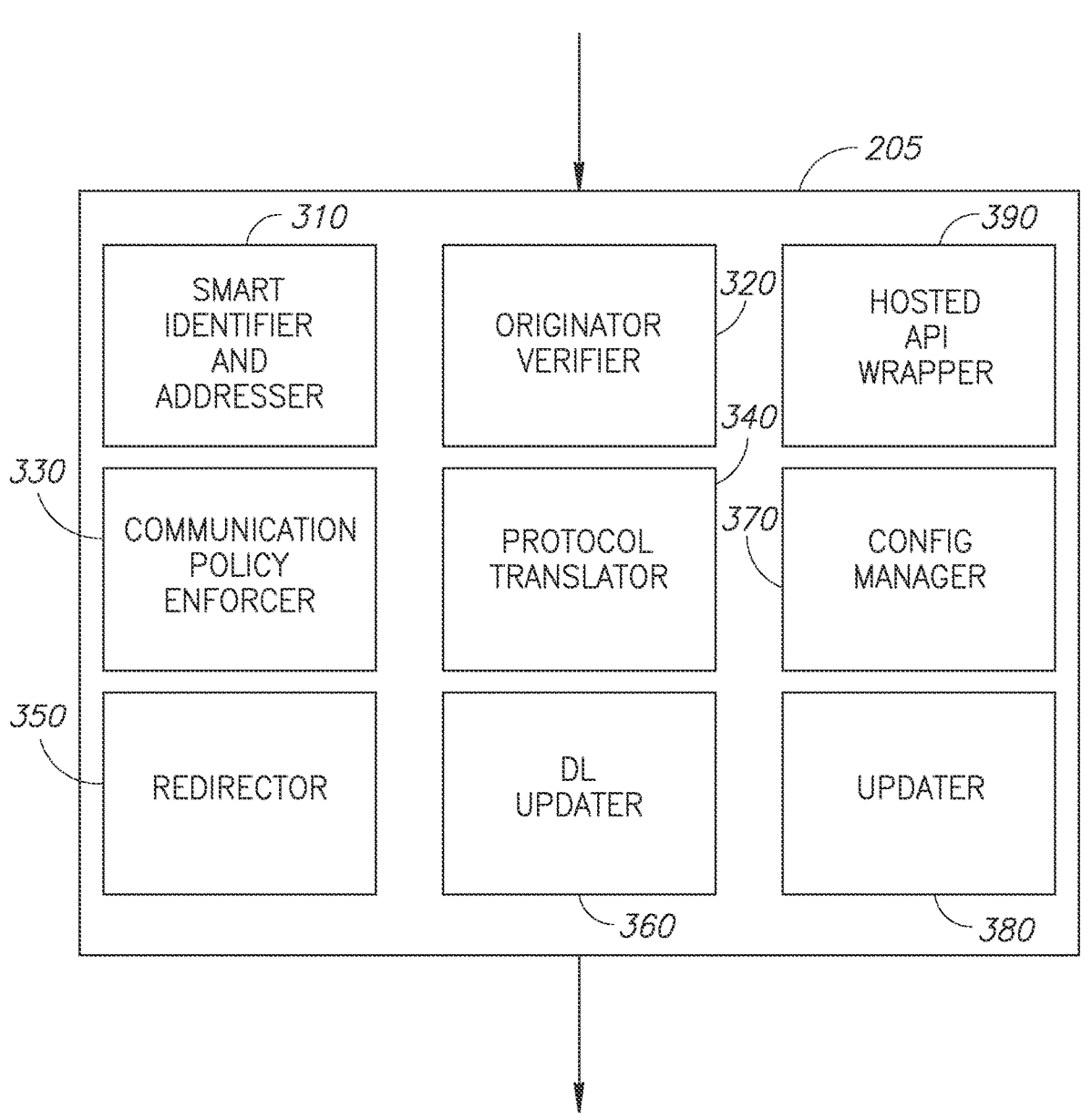
FIG. 11C is a schematic illustration of the elements of the communication hub of FIGS. 11A and 11B, constructed and operative in accordance with the present invention.

Reference is now made to FIGS. 11A and 11B which illustrate different implementation embodiments of hub 205 and FIG. 11C which illustrates the functionality of its different elements.

Hub 205 may comprise a smart identifier and addresser 310, an originator verifier 320, a communication policy enforcer 330, a protocol translator 340, a redirector 350, a dynamic layout updater 360, a configuration manager 370, a general updater 380 and a hosted application programming interface API wrapper 390. The functionality of these elements will be described in detail herein below. It will be appreciated that all the functionalities are applicable to all cross-domain communication channels, such as the third party application 40 to website building system 30 channel and third party application 40 to another third party application 40.

FIG. 11A to which reference is now made illustrates a typical embodiment for hub 205 through an intermediate iframe [a] which uses an internal communication application programming interface (API) to contact website building system 30. This way messages [c] sent (for example) from the TPA [d] to the TPA [e] (which use communication API modules [f] and [g] respectively) may be analyzed, verified or modified in ways which apply application-specific knowledge.

An alternative embodiment as is illustrated in FIG. 11B to which reference is now made does not use an intermediate iframe, but rather uses cross-domain communication in one or both of the communication API modules [a] and [b] (embedded into the third party applications [c] and [d] respectively). The modules [a] and [b] interact directly with website building system 30 to receive application-specific knowledge and use it when handling the communication message [f]. This embodiment has the disadvantage (compared to the embodiment shown in FIG. 11A) in that considerable amount of website building system 30 level information may be processed inside a module included in a third party application 40, and this information might be accessed (or even modified) by a malicious third party application 40.

As discussed herein above, in all the cross-communication methods described herein above, iframe addressing is based on the origin of the iframe (including source domain, protocol and port i.e. using direct third party application 40 addressing when sending a message (to specify the recipient) as well as when receiving a message (as the name of the sender provided to the recipient). In addition message sending requires the sender to specify the target iframe window (using JavaScript's documentgetElementById(" . . . ").contentWindow call or any other method). Thus, in existing systems, each third party application 40 must contain the full and specific details of any other third party application 40 with which it may communicate (including domain, protocol, port and iframe ID).

It will be appreciated that this type of direct addressing may be unwieldy in the environment of system 100. Even though designer 5 may integrate third party applications 40 from multiple non-coordinated third party application 40 vendors, third party application 40 vendors may supply third party applications 40 which are hosted in given domain, but are later moved to a different domain or sub-domain. A third party application 40 vendor may change the protocol or port used to contact any given third party application. Designer 5 may be required to modify the design of containing web page 203 containing third party application 40. All of these may occur in the third party applications 40 used in a web site which is operational and is being accessed by numerous users. In addition, a single containing web page 203 may include multiple instances of one third party application 40 which may serve different functions. For example, a single page in a product support web site might contain two chat third party application 40 instances—one for user-to-user chat and forum, and one used to converse with a vendors' support person when available.

It will be appreciated that smart identifier and addresser 310 may be fully aware of the structure of containing web page 203 and of the details of third party application 40 (as provided by the third party application 40 vendor to the website building system 30). Smart identifier and addresser 310 may provide addressing of source or target third party applications 40 to each other using any of the following: a third party application 40 unique name (as registered in AppStore 25); a third party application 40 instance descriptive ID added to each third party application 40 instance in containing web page 203 thus allowing the addressing of multiple instances of the same third party application 40; a generic identifier for a required third party application type/class (e.g. "I would like to send the message <x> to any event logging third party application 40 instance in containing web page 203"). Such an identifier may also describe the specific services which should be supported by the third party application 40. Smart identifier and addresser 310 may also use version indication for example: "I would like to send the transaction <x> to an instance of the accounting package <y> but only if it is of version <z>".

It will be appreciated that during runtime, third party applications 40 only communicate with hub 205, and therefore only need to know direct address of hub 205, and not of any other third party application 40. This one direct address may be encapsulated by a communication API wrapper (such as communication modules f and g as illustrated in FIG. 11A and communication modules a and b as illustrated in FIG. 11B) provided by the website building system 30 to the third party application 40 provider. The calling third party application 40 may provide the application-aware third party application 40 descriptive addresses (as described above) and smart identifier and addresser 310 may translate them into direct third party application 40 addresses and perform the routing. This way, third party application 40 does not need to maintain a table of the absolute addresses of all possible third party applications 40 with which it communicates.

It will be appreciated that message originator verification is critical otherwise a receiving third party application 40 may receive a message from a hostile third party application 40. Since all communication may occur via hub 205, originator verifier 320 may check the authenticity of all incoming messages from third party applications. Originator verifier 320 may also provide additional information which may be added to the message and may be used for additional verification. It will be appreciated that since every third party application 40 included in AppStore 25 and used by system 100 is registered with website building system 30, hub 205 may verify with website building system 30 if a unique originator ID which may be included in the message, matches the message origin (domain, port, etc.).

Third party application 40 may define a general communication policy which may depend on external information, containing web page 203 information etc. Communication policy enforcer 330 may ensure that the communication policy in question is enforced without having to deal with non-conforming communication. For example, in a classified information handling web site, third party applications 40 might be tagged with a classification level field in their profile. A third party application 40 providing a back-end event logging database which is certified to a classification level X may define a policy whereby it will not accept events for logging which have a classification level greater than X. Communication policy enforcer 330 may in such a situation, perform the required preliminary filtering, and prevent highly classified messages from even reaching the lower classification application.

Figure 12:
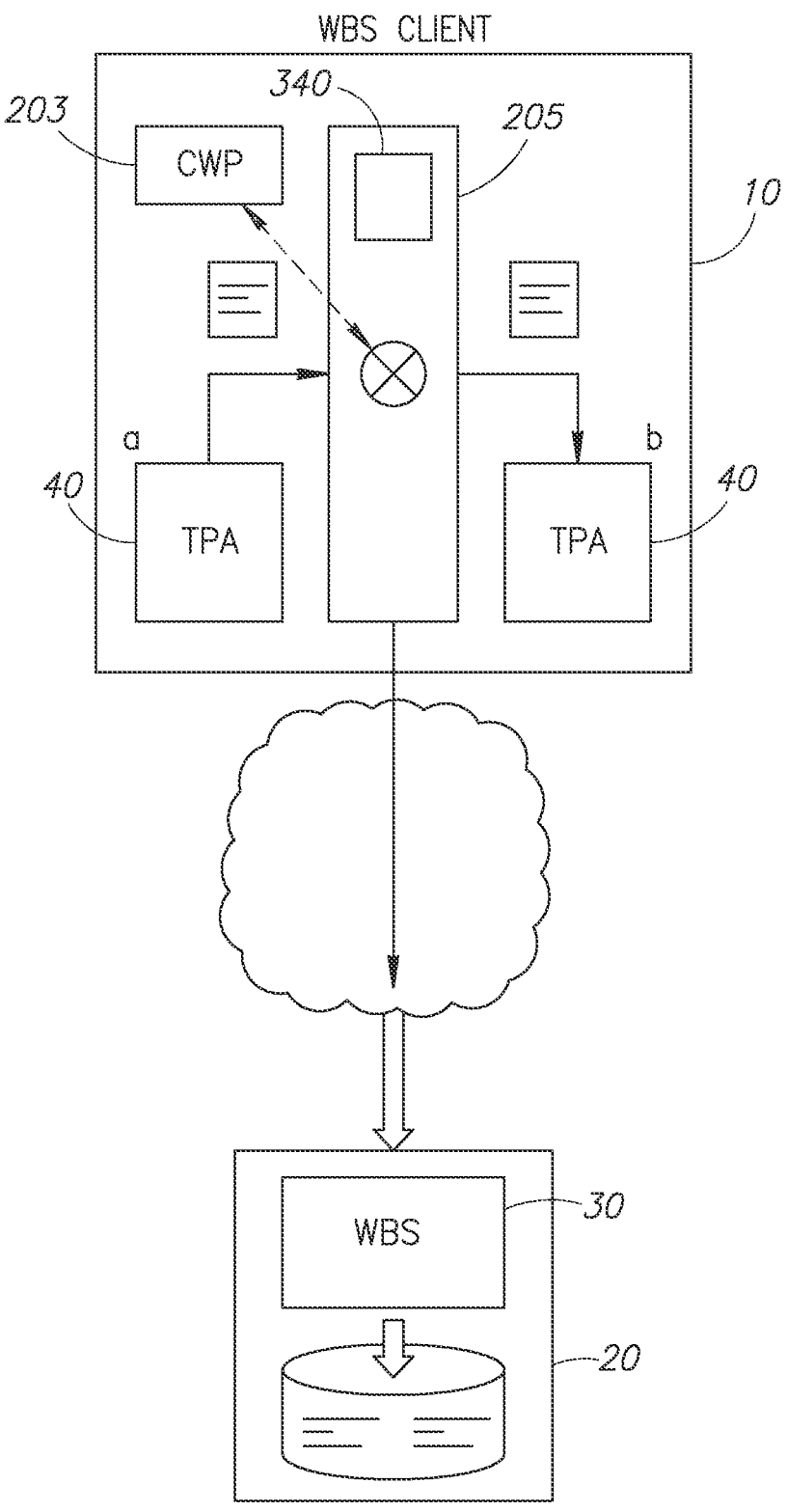
FIG. 12 is a schematic illustration of a communication translation scenario performed by the communication hub of FIGS. 11A and 11B, constructed and operative in accordance with the present invention.

It will be further appreciated that designer 5 may wish to include two (or more) third party applications 40 in the same created web-site which could possibly cooperate, but do not actually do so due to some protocol compatibility issue. For example as is illustrated in FIG. 12 to which reference is now made, e-Shop third party application 40 [a] may have the capability to post purchase order messages to a fulfillment and shipping third party application 40 such as the third party application 40 [b] (provided by a different vendor). However, the information provided by the third party application 40 [a] may not include some fields required by the third party application 40 [b]. Such situation should typically be resolved by the third party application 40 vendors of the third party applications 40 involved, but in some cases such resolution is not possible (e.g. one of the two third party applications 40 is not currently updated for some reason). Protocol translator 340 may translate the relevant messages from [a] to [b] (e.g. by providing the additional required fields). Such translation may be performed by protocol translator 340, or may possibly involve some interaction with the embedding web site and containing web page 203 (e.g. if additional information is needed).

It will be further appreciated that third party application 40 may have some capabilities which require sending or receiving messages from another third party application 40 (such as the e-Shop/fulfillment third party application 40 pair described above). However, in some cases a part of the solution may be missing, in the above example, it may happen that no matching or appropriate fulfillment third party application 40 exists. In such a case, redirector 350 may allow designer 5 to specify that given messages may be routed to or from a containing web page 203 component and that the matching capabilities may be resolved by the containing web page 203 component and the functionality the components may provide. This may allow construction of the full web site without requiring the construction of a special-purpose third party application 40. Therefore transactions may be posted to a website building system 30 component which can perform logging of transactions to a database, and the database may be later used (by a separate program) to perform off-line fulfillment and shipping.

Third party applications 40 may provide multiple configurations, having different capabilities, using the same code base but with different enabled functionality. For example, a third party application 40 may provide basic functionality through a free version, and additional func-tionality through a purchased premium version, multiple paid versions or additional purchased third party application 40 features.

It will be appreciated that system 100 may include a website building system 30 based management of the per-user (or in fact per-designer) third party application 40 purchase status. It will be further appreciated that the designers may all be registered website building system 30 users and website building system 30 can thus manage a database of third party application 40 purchases for each designer 5. This information may be stored in property sheet 23 by TPA coordinator 24 during the design phase and by configuration manager 370 during runtime. For example, a third party application 40 may send a website building system 30 client-side element a version inquiry message. The website building system 30 client-side element may consult with repository 22 or with a locally cached copy thereof and return a response message to third party application 40 with the information about the capabilities it should provide.

In an alternative implementation, website building system 30 may provide third party application 40 with the required third party application 40 configuration information via an alternative channel, such as an encrypted iframe parameter, without requiring a previous inquiry message.

As discussed herein above, third party application 40 may communicate directly with specific containing web page 203 components. Third party application 40 may identify the components to communicate with in a number of ways: directly for components based on associated templates (described in more detail herein below); though an access ID explicitly provided by designer 5 to specific containing web page 203 components; by traversing a (possibly selective) component model provided by containing web page 203 to third party application 40.

It will be appreciated that during runtime, updater 380 may implement messages and responses between containing web page 203 components and third party application 40. For example third party application 40 may affect or query the visual and display attributes of containing web page 203 components (such as their position, size, color, transparency etc.). Updater 380 may also enable third party application 40 to read or write the content of containing web page 203 components and may also allow third party application 40 to direct components which perform media functions, e.g. post a given audio or video segment to a media player component, or require it to pause playing for a given period.

Updater 380 may also facilitate website building system 30 components to specify the type of access they allow third party applications 40 to have—similar to the way in which access permission bits or access control lists (ACL's) function for the protection of files in modern operating systems. Such permissions may be defined for each component so as to apply for all third party applications 40, from specific vendors or for specific third party applications 40. For example a third party application 40 may be allowed to access a text field which is part of containing web page 203 outside third party application 40. This text field may be used to edit a blog entry for a blog third party application 40, providing more screen real estate than that which can be provided inside the blog third party application 40 area itself. It will be appreciated that for third party applications 40 embedded into specific mini-pages inside a multi-page container, website building system 30 may limit the access of third party application 40 to components in the specific mini-page alone.

It will also be appreciated that updater 380 may also allow a third party application 40 to affect site-global elements. This may include getting and setting attributes such as the current page in the site, the current mini page in a container containing third party application 40 and the page history. Updater 380 may also filter or limit such requests.

Updater 380 may also enable website building system 30 to affect the style and display of third party application 40. Updater 380 may implement calls through which website building system 30 may provide formatting and style guidelines to the third party application 40. These may include properties such as: colors and color schemes; fonts; character sizes; transparency; animation and special effects (e.g. blurring). The color scheme, in particular, may include a generic color scheme (e.g. use the following x colors), or as high-level color (e.g. use the color x for text, color y for frames).

It will be appreciated that one preferred method to express complex style information is the use of Cascading Style Sheets (CSS), which can express a combination of multiple style directives, including fonts, sizes, colors etc. Updater 380 may send such CSS-based messages to third party application 40. The style sheets may be generic in nature, or include specific style names defined by the third party application 40, so that website building system 30 may provide better guidelines to third party application 40 (e.g. a style sheet may refer to specific third party application 40 elements and provide guidelines for them).

Third party application 40 may then use these guidelines to make its own look and feel and better adapted to containing web page 203. This is particularly important for third party applications 40 included or visible from multiple containing web pages 203 in the same site (multi-port inclusion as noted above). The multiple containing pages might employ a different color scheme or general design. Third party application 40 may use the information provided to it through these style messages, and adapt its own display colors and style to better fit each containing page, and avoid displaying discordant color schemes or looks and feel as compared to the containing page.

It will be appreciated that dynamic layout DL updater 360 may enable website building system 30/third party application 40 or third party application 40 and a secondary third party application cooperation in handling display changes resulting from a dynamic layout event. Website building system 30 may change the size and position of the components in a page in order to preserve the page design under events which change some of the components in the page. These dynamic layout events may include, for example: viewing the web site on screens having different sizes; rotating the display device between portrait and landscape mode; changing the size or position of some of the components and changing the content of given components (in a way which requires them to change their size). A dynamic layout event may also include a component update resulting from a server-based content update—e.g. in a component displaying information from a data feed, or due to content change by another concurrent user of the same web site. It will also be appreciated that dynamic layout events may occur in the design environment as well as the run-time environment. In particular some components and third party applications 40 may allow component content change or size/position change during run-time (i.e. by the end-users), and not just by the designers.

It will also be appreciated that a dynamic layout event might also be caused by third party application 40. For example, an e-Shop third party application 40 may require a size change when the user moves from a product catalog view to a shopping cart view (having a different size). As another example, a product catalog third party application 40 may include the option for product highlighting, which would cause them to display a larger catalog page including more content. A third example is a multi-region third party application 40 which may start or stop displaying additional regions.

Existing systems typically handle such situations (if at all) by clipping the third party application 40 display, adding scroll bars to it or just resizing it as a pop-up window which hides other page components as illustrated in FIG. 6, back to which reference is now made. Dynamic layout updater 360 may implement cooperative dynamic layout in which website building system 30 and third party applications 40 cooperate in performing dynamic layout and retain the basic design of containing web page 203. The functionality of dynamic layout is further described in U.S. Pat. No. 10,185, 703 filed 20 Feb. 2013, issued on Jan. 22, 2019 and assigned to the common assignees of the present invention. However, even in a cooperative dynamic layout supporting system, the dynamic layout mechanism in containing web page 203 does not have full control of the internal layout of third party application 40. Furthermore, website building system 30 widgets may be designed so they can be resized to any arbitrary size (within a given range), but third party application 40 may not support arbitrary resizing. Third party application 40 may provide, for example, any combination of the following: a number of display configurations having different sizes (e.g. display more or less details); the ability to resize some of its internal elements and the ability to display some of its internal text elements using multiple font sizes.

Third party application 40 may still offer a limited number of possible display sizes, and may have the entire range of possible sizes. Therefore, a [containing web page 203 ➔ third party application 40] resizing request may be resolved by third party application 40 switching to the nearest possible size, or by providing a list of possible third party application 40 sizes (and allowing website building system 30 to select the right one to use).

Dynamic layout updater 360 may implement [containing web page 203➔ third party application 40] cooperative dynamic layout using the following sequence:

For example, third party application 40 embedded in containing web page 203 may need to be resized to a given desired size (e.g. X1*Y1 pixels). Dynamic layout updater 360 may send third party application 40 a message requesting that third party application 40 resize its content to the given desired size (X1*Y1). Third party application 40 may adjust to that size—by using alternative display configuration, internal resizing, internal dynamic layout processing or any other means. It will be further appreciated that containing web page 203 may resize the external iframe window containing third party application 40 to the new size (X1*Y1).

It will be also appreciated that third party application 40 may only allow re-sizing to a limited set of possible sizes (e.g. specific user interface configurations). Thus, dynamic layout updater 360 may use the following alternative algorithm which allows the third party application 40 to provide a set of possible sizes.

Containing web page 203 is resized and dynamic layout updater 360 sends third party application 40 a message requesting third party application 40 to resize its content to the given desired size (X1*Y1). Third party application 40 may then determine the nearest possible size (e.g. X2*Y2 pixels) and resize accordingly by using alternative display configuration, internal resizing, internal dynamic layout processing or any other means. Updater 380 may then send containing web page 203 a response message confirming the resizing and provide the actual new size (X2*Y2). Containing web page 203 may resize the external iframe window containing third party application 40 to the actual new size (X2*Y2). Containing web page 203 may continue the dynamic layout processing, based on the actual new size (X2*Y2).

It will be appreciated that another embodiment is also applicable, in particular if there are multiple third party applications 40 in containing web page 203 (or multi-region multiple third party applications 40). In this embodiment containing web page 203 may query the embedded third party applications 40 to get the list of display sizes so that they may attempt to optimize the look and feel taking into account the multiple options for the multiple third party applications 40. This embodiment may also be relevant in the case of third party applications 40 displayed over multiple regions.

Containing web page 203 may perform dynamic layout processing, discovering that one or more third party applications 40 (TPA[1] to TPA[n]) are embedded in containing web page 203 and should be resized using the following algorithm:

Loop on i from 1 to n:

For each TPA[i] determine

The minimal size Xmin[i]*Ymin[i];

The maximal size Xmax[i]*Ymax[i];

The optimal size Xopt [i]*Yopt [i];

Dynamic layout updater 360 may send a message to TPA[i], detailing the min/max/opt sizes above, and request information about possible third party application 40 sizes.

Third party application 40 may provide to dynamic updater 380 a set of possible size options which it may assume, Xposs[i][j]*Yposs[i][j].

Based on the Xposs[ ][ ]/Yposs[ ][ ] information collected above, containing web page 203 may calculate a solution for the dynamic layout calculation by using (for example) a full evaluation of all possible third party application size combinations, linear programming techniques or any other technique used by the dynamic layout algorithm.

Store the results in Xfinal[i]/Yfinal[i] for all TPAs

Loop on i from 1 to n:

Containing web page 203 may then send a resize message to TPA[i] with Xfinal[i]/Yfinal[i];

Containing web page 203 resizes the external iframe window containing TPA[i] to Xfinal[i]/Yfinal[i];

Containing web page 203 continues the dynamic layout processing, based on the actual new sizes.

It will be appreciated that dynamic layout processing may typically require moving the third party applications 40 and not just resizing them. However, a third party application 40 should be invariant to the exact location of its frame inside containing web page 203.

As discussed herein above, third party application 40 may also need to change its display window size from time to time. Since the size of the window displaying an iframe is managed by the hosting page (i.e. containing web page 203), the third party application 40 window size change has to be performed by containing web page 203—with third party application 40 requesting (via dynamic layout updater 360) from containing web page 203 to change the window size.

It will also be appreciated that third party application 40 may also request (via dynamic layout updater 360) to change its position inside containing web page 203. This may not affect third party application 40 internally (as a size change does), but does require display changes in containing web page 203. Dynamic layout updater 360 may integrate this request with the dynamic layout. Containing web page 203 may activate dynamic layout updater 360 to change the third party application 40 window size (and possibly its location) and confirm the size and position change back to third party application 40.

It will be appreciated that hub 205 may also implement additional third party application 40 class-specific or third party application 40 specific messages through which website building system 30 itself, a specific containing web page 203 or a secondary third party application 40 may affect third party application 40. For example, a blog third party application 40 may define an incoming message which may post a new blog entry, or a new talk-back to the current blog entry. Such a message may be used by containing web page 203 (e.g. as a way to post blog entries from a large editing field outside of the third party application 40 area). It could also be used for higher-level application-to-application link, e.g. allowing a support third party application to post blog entries to a blog third party application.

It will be appreciated that third party applications 40 often require a wide variety of complex services—either for third party application 40 internal use or for downstream use by designers using third party application 40 in their sites. Such services may include user management, billing and shipping management. The website building system 30 vendor may not be able to provide such services as part of the website building system (e.g. due to technical or business considerations). Furthermore, these services may be unsuitable for "packaging" as third party applications 40 by themselves. In addition, a third party application 40 vendor may need the option to provide multiple such services for a designer using the third party application 40 (e.g. multiple $3^{rd}$ party billing API's)—and allow designer 5 to select the right one for his or her use.

For example, a Paypal™ hosted API may be offered in website building system 30 and may be used directly by third party application 40 or may be offered by third party application 40 to the designers 5 using it. Third party application 40 may also offer its own set of options (i.e. use specific billing type, such as one-time, recurring or revenue sharing), and implement these options by calling the hosted Paypal API.

Thus, designer 5 using website building system 30 may develop a specific offering (such as a song-selling e-Store) which uses advanced billing. Designer 5 may avoid having to negotiate a specific clearing or merchant agreement with the billing API provider by using the hosted billing API—either directly or through a third party application 40 offering an additional abstraction level (or layer). In this sense, website building system 30 may become a distributor for the hosted API vendors.

Hosted API wrapper 390 may facilitate this communication between the different parts of the system (e.g. website building system 30, the hosted API code and the included third party applications 40) It will be appreciated that the API wrapper layer, and the actual API implementation may reside within website building system 30 itself or another third party application 40. The third party application 40 vendor (or designer 5) may use an hosted API through hosted API wrapper 390 without being aware of the way in which the actual underlying API is implemented.

In an alternative and complementary embodiment to the present invention, Applicants have also realized that smart integration between website building system 30 and one or more third party applications 40 may also be achieved by using an integration model in which additional website building system templates and components are associated with the third party applications 40 at the level of the AppStore 25 as well as with the relevant third party application 40 instances. Third party application 40 may also communicate with these components (as well as with non-associated components) to exchange data and control messages. As discussed herein above, third party application regions 40 within a containing web page 203 are separate iframes whose content is hosted in separate domains (third party application vendors' or otherwise)—different from the domain on which the main site is hosted. Thus, communication between the different iframes is subject to browsers' "same origin policy" and requires the use of techniques as described herein above.

Existing systems implement third party applications 40 as monolithic, rigid objects which are included in containing web page 203 but do not otherwise affect the look and feel of containing web page 203 itself. The third party 40 instance is placed in a (typically rectangular) area, and performs all of its activities within this area.

Applicants have also realized that this notion may be expanded by having an (optional) additional website building system 30 template associated with third party application 40, referred to as an associated template in accordance with an embodiment of the present invention. It will be appreciated that this association may be performed during the development and publishing of third party application 40 and may be presented to designer 5 as part of the third party application 40 selection/purchase process (from AppStore 25) and third party application 40 instance creation. TPA coordinator 24 may retrieve the template associated with the third party application 40 (as part of the application repository managed by the AppStore 25 or otherwise provided by the third party application 40 vendor) and may store the template in repository 22 for later use as described herein above.

It will be appreciated that system 100 may support the publishing of third party applications 40 with multiple associated templates—allowing designer 5 to select a template which best suits his or her needs.

It will be appreciated that when creating an instance of the third party application 40 in any containing web page 203, the components in the associated template may be merged with containing web page 203 and may be displayed together with any other components in containing web page 203.

Figure 13:
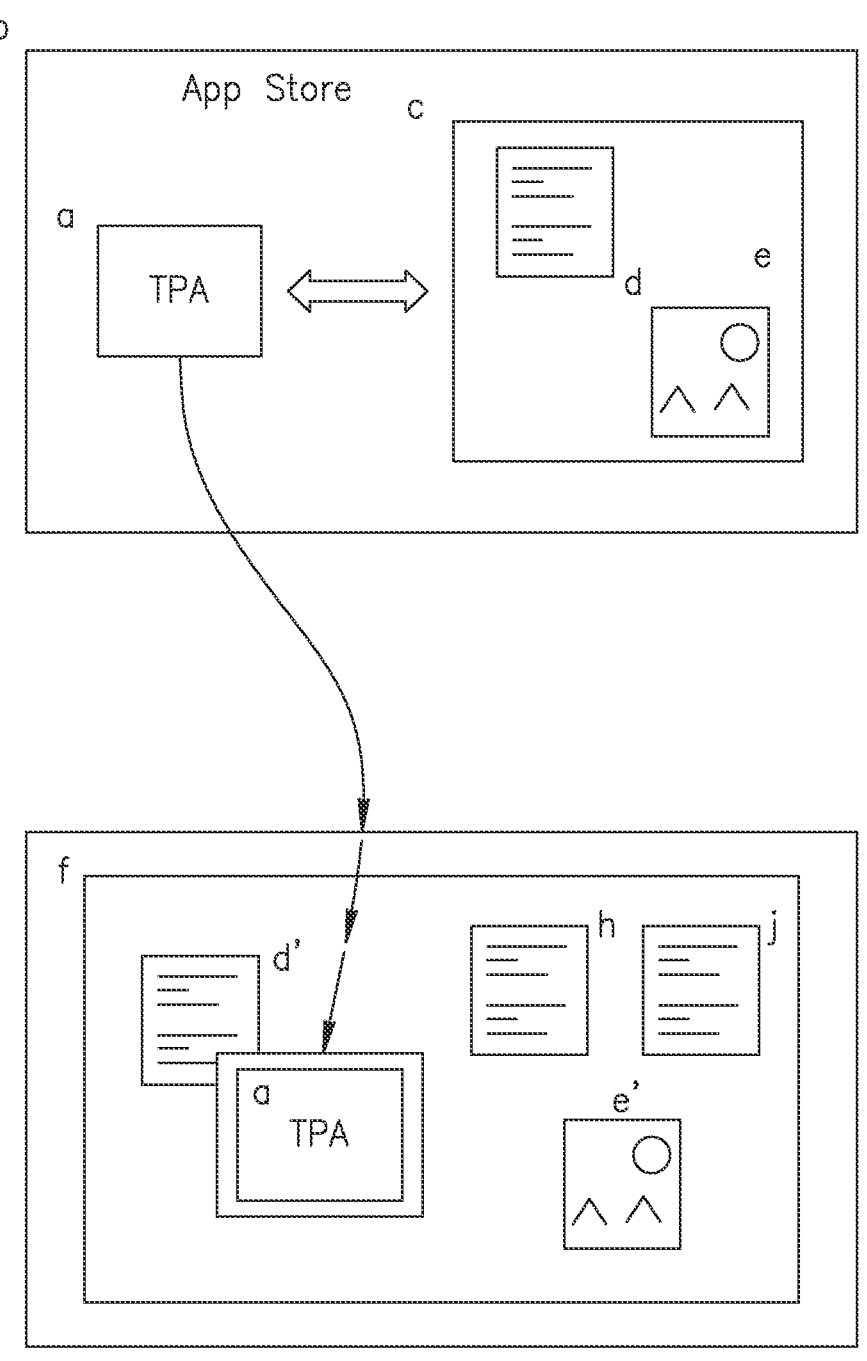
FIG. 13 is a schematic illustration of a containing web page handling a third party application which has an associated template, constructed and operative in accordance with the present invention.

Reference is now made to FIG. 13 which illustrates an example of the use of an associated template according to an embodiment of the present invention. As is shown, third party application [a] is placed in AppStore [b] together with associated template [c] that includes components [d] and [e]. It will be appreciated that when third party application [a] is included in containing web page 203 [f], third party application [a] may be displayed in its designated area [g] inside page [f] and instances [d'] and [e'] of the components [d] and [e] may be displayed on the page [f] together with the pre-existing components [h] and [j].

It will be appreciated that system 100 may support multiple ways in which the associated template component instances (e.g. [d'] and [e'] above) are positioned in the containing web page 203 [f]. These may include: absolute placement (i.e. using the size and position specified in the associated template [c] for the original [d] and [e]); target-relative placement (i.e. adjusting the size and position of the new instances [d'] and [e'] according to the containing web page 203 [f]); and third party application 40 relative placement (i.e. adjusting the size and position of the new instances [d'] and [e'] relative to the size and position specified for the third party application instance [g] inside containing web page 203 [f]). Determination of the specific placement method may be done based on settings included with the associated template [c], possibly allowing designer 5 to override it.

It will be further appreciated that designer 5 may modify the instances in [f] of the components [d] and [e] inherited from the template [c]. The changes may only apply to the use of [d] and [e] within [f] (and possibly pages inheriting from within website building system 30 which support inter-page inheritance), but may not affect the "original" template [c] associated with third party application [a] in AppStore [b].

Figure 14:
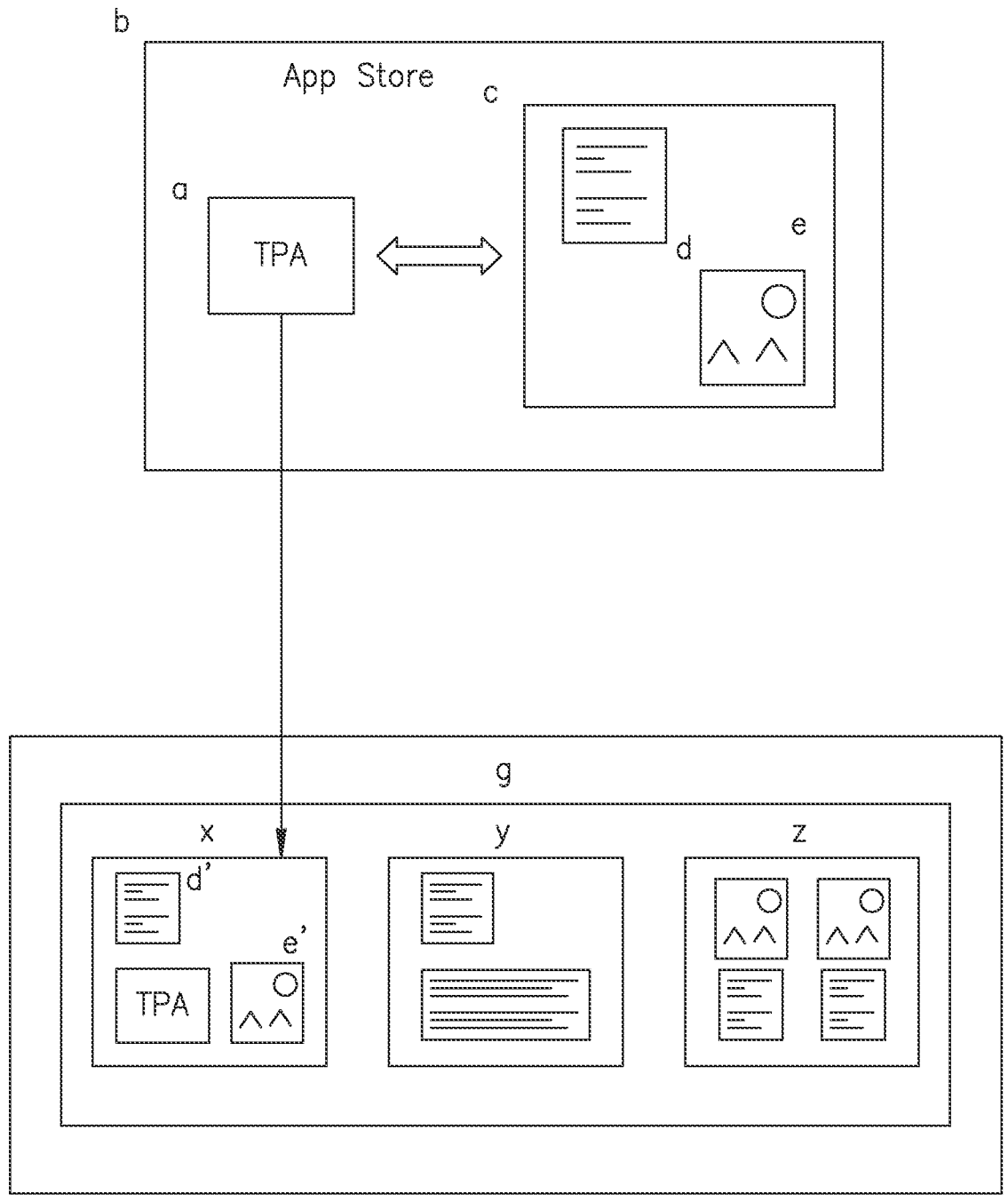
FIG. 14 is a schematic illustration of a containing web page that includes a third party application which has an associated template inside a mini-page, constructed and operative in accordance with the present invention.

It will be appreciated that the changes to the [d] and [e] instances above may include, in particular, assigning specific content (text, images, etc.) to the field instances—as well as regular attribute changes. It will be further appreciated that if third party application 40 is included inside a mini-page, the associated template is applied to the specific mini-page in which third party application 40 is included as is illustrated in FIG. 14 to which reference is now made. As is shown, third party application 40 is included in mini-page [x], and thus the components [d] and [e] are added to [x] but not to the additional mini-pages [y] and [z] of the same multi-page container [g].

It will be further appreciated that for section-type mini-pages, the associated template (if any) is applied to the virtual (and empty) containing web page 203 created to contain the third party application 40.

In an alternative embodiment, the pre-created associated template may be applied to a newly created page or mini-page, which is "parallel" to the including containing web page 203. This newly created page or mini-page may be initialized with the template, which could then be modified as desired.

Website building system 30 may also allow multi-port inclusion—in which the same third party application 40 instance is visible from and "resides in" multiple pages of the main site. This is different from multiple inclusion of a given third party application 40 in the main site—which creates multiple instances of the third party application 40. The third party application 40 content—which is instance-specific—is thus shared between the multiple views of the same multi-port third party application 40.

In such multi-port inclusion, the associated template may be applied separately to each of the pages and mini-page to which the third party application 40 instance is added.

As discussed herein above, system 100 may provide a 2-way communication link between third party application 40 and the components in containing web page 203. It will be appreciated that this includes containing web page 203 components resulting from the merging of the associated template from third party application, as well as components which are unrelated to any such associated template.

Thus it will be appreciated that a third party application 40 vendor may typically create a number of templates to be associated with the third party applications 40 produced by the vendor. These templates may include test, development and other templates in addition to the templates which are actually being distributed (i.e. associated with currently distributed third party application versions).

As discussed herein above, third party application 40 may be distributed through AppStore 25, and may also be distributed through alternative channels not related to or managed by the website building system 30 vendor. However, the associated templates distributed with third party application 40 may be highly related to and coupled with application repository 22, as they are built using components, base templates and other elements managed by website building system 30.

Furthermore, website building system 30 elements underlying such a separately-distributed associated template may have to be modified or deleted—possibly "breaking" the associated template. To resolve this problem, system 100 may implement these associated templates in a separate area (possibly per-third party application 40 vendor) inside application repository 22. Website building system 30 may manage these templates in the same way as other website building system 30 templates.

It will also be appreciated that the third party application 40 vendor may be provided with a unique ID (the development ID) for each template created, and may use this ID during third party application 40 development and testing process. Once third party application 40 is to be published/distributed, the third party application 40 vendor may be required to apply for and receive an alternate unique ID (the publishing ID), and may reference it in the published third party application 40. Once a publishing ID is provided, a separate locked copy of the template is created. This is the copy referenced by third party application 40 and used when creating instances of the third party application 40. In this way, the third party application 40 vendor is unable to mistakenly modify a template associated with a "live" third party application 40 (which is being included by designers) and referential integrity is preserved. Furthermore, system 100 may cross-reference the relationship between such locked templates and the underlying components and base templates. This cross-reference can be used, for example, to provide a warning to website building system 30 staff if a website building system 30 component or a base template included in such a locked template is to be modified (and such modification may break the template or the third party application 40 in some way).

Therefore system 100 may provide bi-directional communication channels between third party applications 40, the components in containing web page 203 and website building system 30. Containing web page 203 components may be based on a template(s) associated with the third party application, based other website building system 30 templates, or be unrelated to any template.

As discussed herein above, communication hub 205 may promote communication and may provide a back channel between a containing web page and any third party applications 40. Applicants have further realized that the data that is flowing backwards and forwards between a containing web page and any third party applications 40 may be useful once collected, processed and integrated.

For example, web site owners need to manage their per-site user population or membership which may be distinct from the registered user base of the pertinent website building system 30. Web site users may be registered or not (anonymous) and the website may provide different levels of capabilities to different levels of users. Furthermore, users may often provide personal or contact information (even as anonymous users) such as data in a contact form, when they activate instant messenger software to contact a site owner or when they connect to a social network as part of working with the site. It will be appreciated that this information may be entered directly into the created site, or may be made available as part of the interaction with third party applications 40 embedded within the site.

It will be further appreciated that these pieces of information may be un-organized, un-correlated, potentially contradictory and many times not saved at all. For example a single given user may enter his personal email on a contact form (operated directly by the site) and his work email in a separate subscription form (operated by third party application 40) in the same session.

Furthermore, those "floating" pieces of information may include different permissions for their use. For example, users filling in their email address in a subscription form fully expect to receive the email-based subscription they have subscribed to and possibly related email newsletters. On the other hand, a user that supplies an email address as a registration ID may not wish to receive any emails to his registration address apart from e-mails relating to his account handling, security alerts etc.

Figure 15:
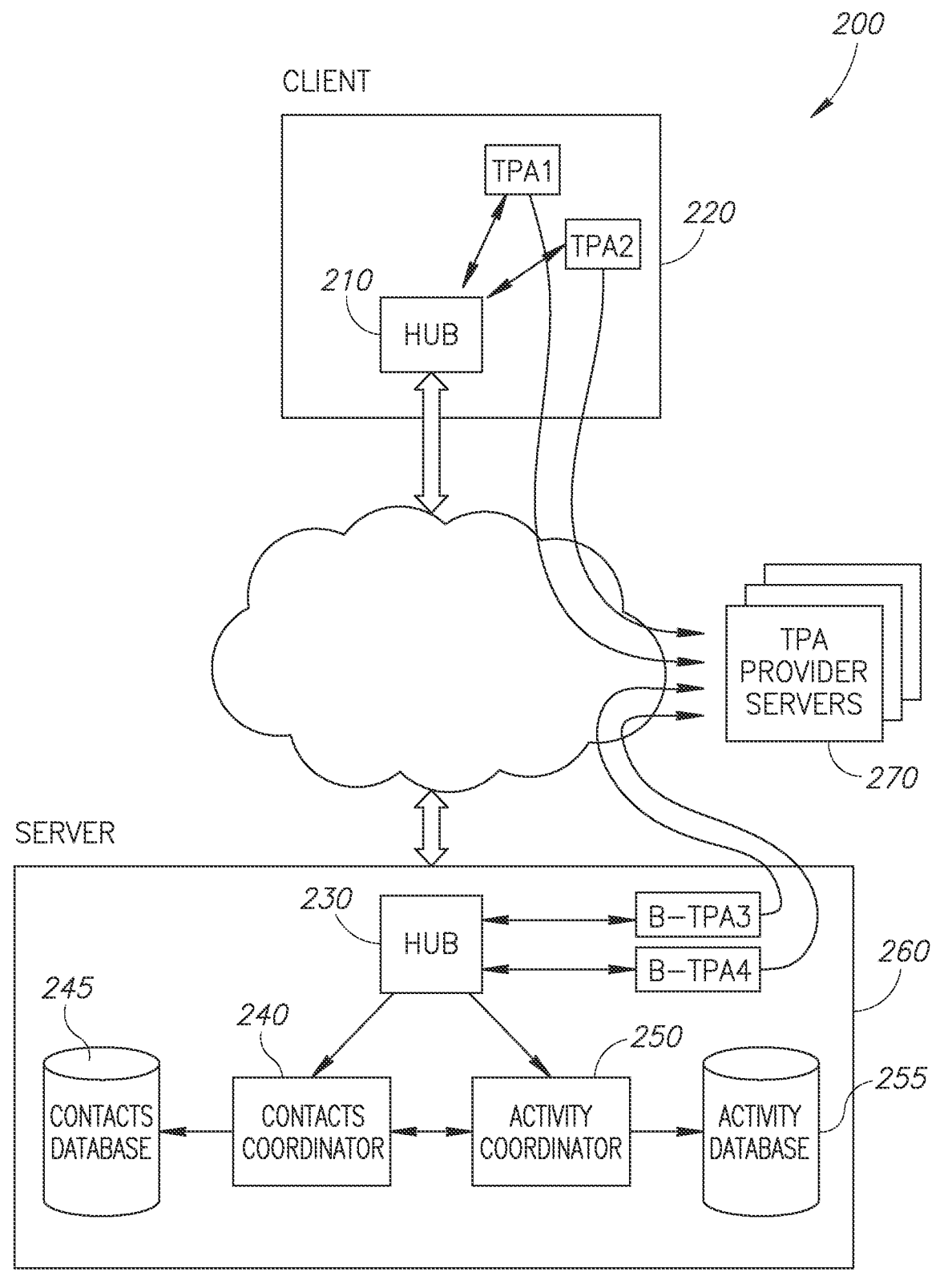
FIG. 15 is a schematic illustration of a system for coordinating and collecting data from different messages exchanged between a website building system and one or more embedded third party applications, constructed and operative in accordance with the present invention.

Reference is now made to FIG. 15 which illustrates a system 200 for coordinating and collecting data from different messages exchanged between a website building system 30 and one or more embedded third party applications 40. System 200 comprises a client hub 210 installed on a client 220 and a server hub 230, a contacts coordinator 240, an activity coordinator 250, a contacts database 245 and an activity stream database 255 installed on a server 260. It will be appreciated that hubs 210 and 230 may facilitate communication between web site building system 30 and multiple third party applications 40 installed on TPA provider servers 270 and between different third party applications 40 as described herein above in relation to hub 205. Contacts database 245 and activity stream database 255 may hold contact/activity information and information extracted from message streams as described in more detail herein below.

Figure 16A:
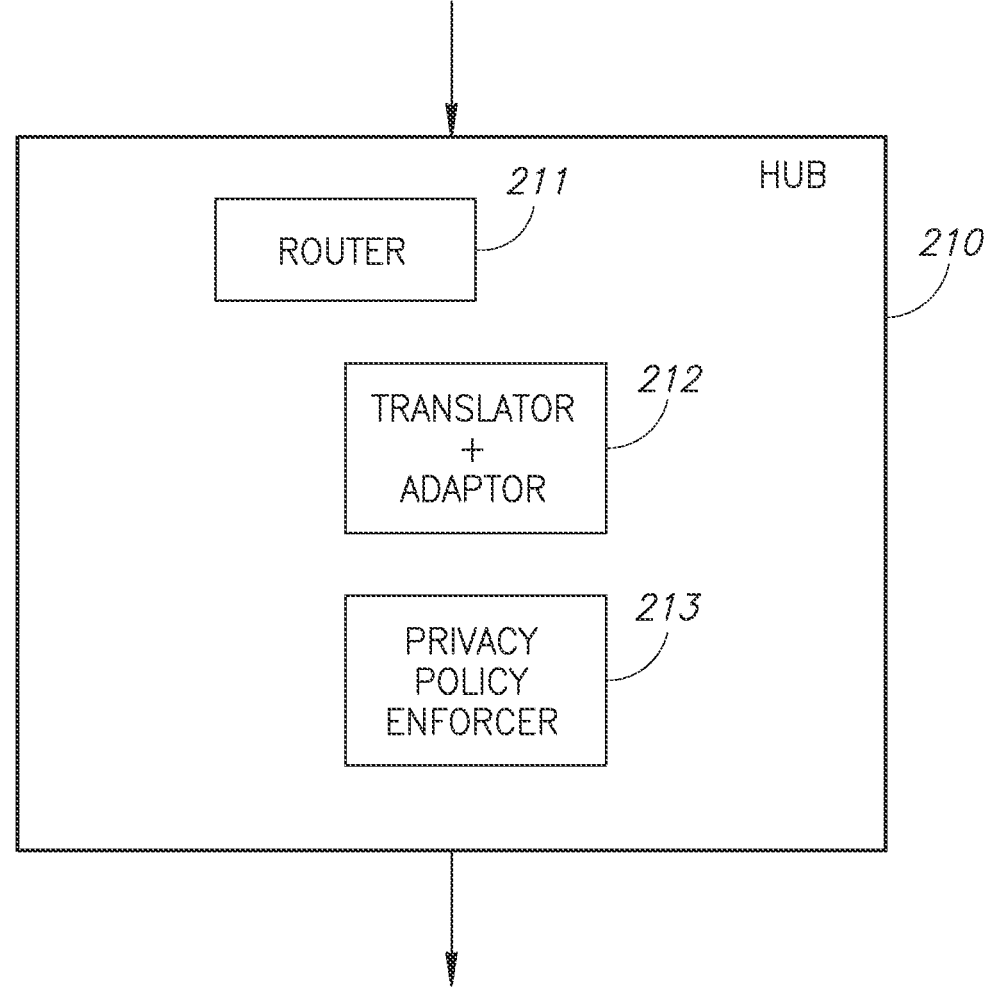
FIGS. 16A, 16B, 16C and 16D are schematic illustrations of the elements of the system of FIG. 15, constructed and operative in accordance with the present invention.
Figure 16B:
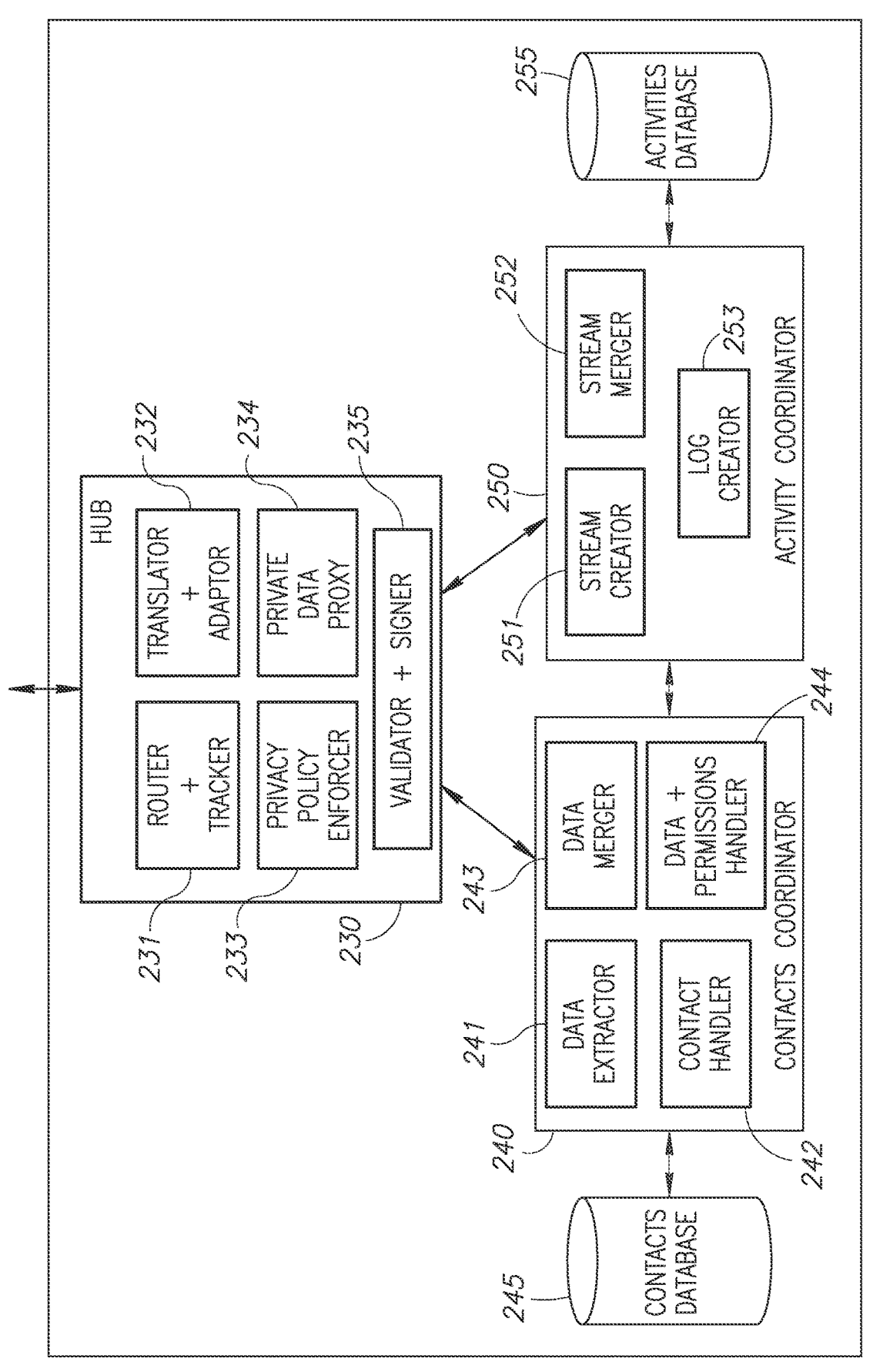

Reference is now made to FIG. 16A which illustrates the elements of client hub 210 and to FIG. 16B which illustrates the elements of server hub 230, contact coordinator 240 and activity coordinator 250. Client hub 210 comprises a router 211, a translator and adaptor 212 and a privacy policy enforcer 213. Server hub 230 comprises a router and tracker 231, a translator and adaptor 232, a privacy policy enforcer 233, a private data proxy 234 and a validator and signer 235. Contacts coordinator 240 comprises a data extractor 241, a contact handler 242, a data merger 243 and a data and permissions handler 244. Activity coordinator 250 comprises a stream creator 251, a stream merger 252 and a log creator 253. The functioning of these elements is described in more detail herein below.

Figure 16C:
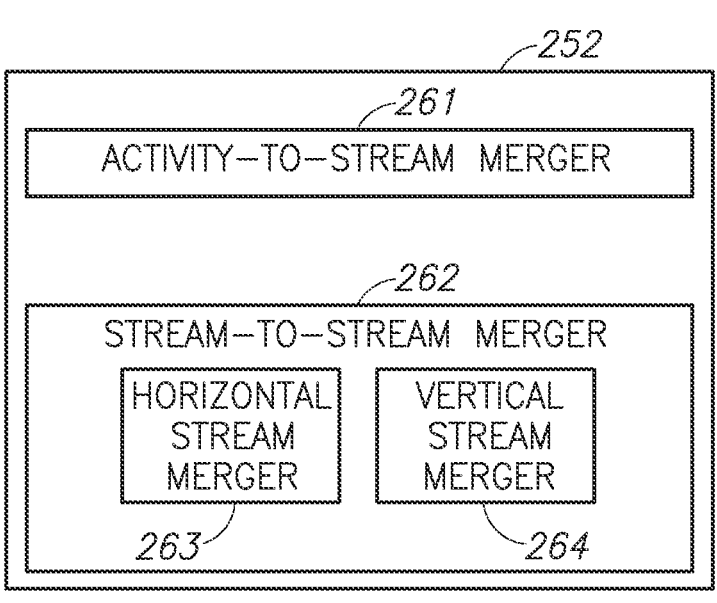
Figure 16D:
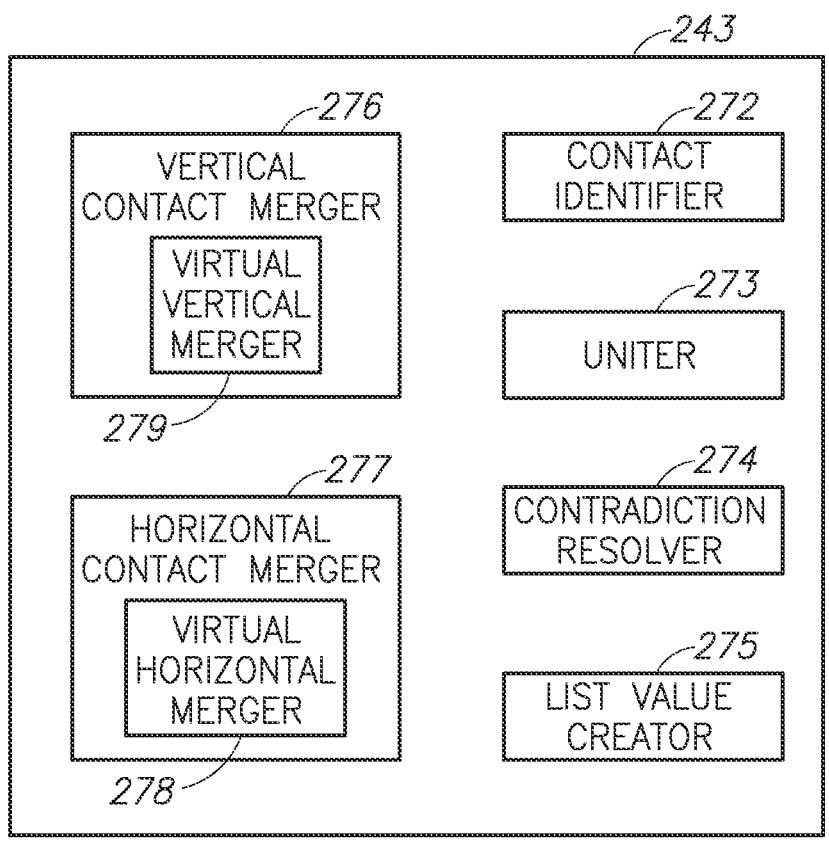

Reference is now made to FIG. 16C which illustrates the elements of stream merger 252 and FIG. 16D which illustrates the elements of data merger 243. Stream merger 252 comprises activity-to-stream merger 261 and a stream-to-stream merger 262. Stream-to-stream merger 262 further comprises a horizontal stream merger 263 and a vertical stream merger 264. Data merger 243 comprises a contact identifier 272, a uniter 273, a contradiction resolver 274 a list value creator 275, a vertical contact merger 276 and a horizontal contact merger 277. Horizontal contact merger 277 further comprises a virtual horizontal merger 278. Vertical contact merger 276 further comprises a virtual vertical merger 279. The functioning of these elements is described in more detail herein below.

It will be appreciated that system 200 may enable message passing between system 200 and multiple third party applications 40 while providing various capabilities including activity message organization by streams, storing activity message histories, multi-level activity message passing, using side channels for activity messages, activity message translation and content adaptation, activity message validation and signing and dynamic activity message routing using listener queries as described in detail herein below.

Furthermore, system 200 may extract user-related information and merge it—uniting information from multiple sources as well as information already existing in system 200. This may be done through merging rules which reconcile disparate and possibly contradicting information. The united information may be stored in contacts database 245. This information may also include usage permission fields controlling the allowed use of the gathered information as described in more detail herein below.

In alternative embodiments to the present invention, both client hub 210 and server hub 230 alone may be used to communicate with the multiple third party applications 40 installed on TPA provider servers 270. It will be appreciated that in the situation where only client hub 210 is used, contacts coordinator 240, activity coordinator 250 together with databases 245 and 255 may be installed locally on the pertinent client.

It will be further appreciated that system 200 may comprise further components which may allow third party applications 40 to manage user contacting activities (e.g. mass mailing of newsletters) while enforcing the usage limitations set by the users themselves. Such components may even insulate the user private data from the third party applications 40—so that the third party applications 40 may perform their actions without having actual access to private user data. Such a capability may be implemented, for example, using private data proxy 234 as described in more detail herein below.

It will also be appreciated that contacts database 245 may be specific to each site. However, website building system 30 may define a meta-site/project level which contains a collection of web sites (owned by the same site owner) and allow specifying that contacts are stored, handled and merged at the meta-site level, rather than single site level. Other site elements (such as included third party applications 40) may also be defined at the meta-site rather than site level. Other than meta-site support, system 200 may typically not share contacts (except as described below) or integrate contact information between different sites or different site owners (so that the data provided by a given end-user to one site is not leaked to another site).

As discussed herein above, system 200 may support multiple interactions between website building system 30 and one or more third party applications 40. Such interactions may be predefined activities such as making a purchase, adding an item to a shopping cart, filling in contact information etc. A third party application 40 may specify which activities it supports and other third party applications 40 may "listen" to specific activities and act upon received activities and their associated information. It will be appreciated that list of listened to activities for a given third party application 40 may be set explicitly to one or more activities or may be determined by an activity listening query as described in more detail herein below.

It will be appreciated that each activity may be considered a message and that each message may include an activity data structure. The activity data structures are predefined data types, but may be defined through inheritance between them and through third party applications 40 which may have the option to extend them by adding fields. They may be specific to the system, or may be based on or include standardized data structures. They may also be encoded in some manner, such as XML, JSON data or using a binary object encoding scheme.

The activity data structure may also include a third party application 40 provided "description" field. This is a third party application 40 based description of the activity (which may be more detailed than what is known to website building system 30). For example, a VOIP communication third party application 40 may provide an activity description text of "Call to John Smith at 999-555-1234—01:15".

The activity data structure may further include a callback link, e.g. "more information", which returns to the activity data structure. This may be used to provide additional substantial information, such as: for an e-commerce activity data structure: full order tracking information, history of orders etc.; for a chat activity data structure: full chat transcript and for a telephony activity data structure: recording of call. Thus, a sample complete activity data structure may contain the following fields: creation timestamp; activity type; source of activity (third party application 40/component ID); activity stream ID; activity type-specific information (depending on activity type); creating site ID; site members database ID; the ID/URL of the site page in which the activity occurred; the activity description provided by third party application 40; a more information link for use by third party application 40 and captured user details etc.

Activity coordinator 250 may be considered a logging element and may receive the data from a passing message from hub 230. Stream creator 251 may create an initial stream which may be considered a log or chain like structure and stream merger 252 may add to it any additional incoming activity with each stream being unique to a contact. It will be appreciated that stream creator 251 may not create a new stream for each separate activity contained in different messages. It will be further appreciated that activities contained in the stream may be out of sequence (for example a third party application 40 may be delayed in reporting the activity). Stream merger 252 may merge streams during an operation if they belong to the same single contact and log creator 253 may save a log file on activity stream database 255 of all previously created activity streams.

As discussed herein above in relation to FIG. 16C, stream merger 252 comprises an activity-to-stream merger 261 and a stream-to-stream merger 262. Activity-to-stream merger 261 may associate an activity into the stream associated with an identified contact and stream-to-stream merger 262 may convert two separate streams into a single stream. Horizontal stream merger 263 may merge two unrelated streams due to a detected common primary ID and vertical stream merger 264 may merge a stream created for an anonymous contact with the stream associated with a registered user upon login or registration which may connect the two. It will be appreciated that stream merger 252 may access previously created streams from activity stream database 255 when necessary.

For example, an anonymous user fills in a contact form in a site. Stream creator 251 may create a new activity stream (with the ID "anon 1") and contact handler 242 may create a new contact (with the ID "anon 1" as described in more detail herein below). The same user may then chat with the site owner. Stream merger 252 may then merge this activity into the "anon 1" activity stream and the contact "anon 1" is updated (as described in more detail herein below). The user, using a different browser, then fills in a schedule form. As there is no correlation to the original user, stream creator 251 may create a new activity stream with the ID "anon 2" and contact handler 242 may create a new contact with the ID "anon 2".

The user then purchases something from the site. Stream merger 252 merges the new activity into the "anon 2"

activity stream and the contact "anon 2" may be updated (with a "customer" tag, for instance).

The user, using yet another browser, registers to the site. When registered, all users receive a "user x" ID from the membership handler of the site. At this point in time, stream creator 251 may create a new activity stream (with the ID "user x") and contact handler 242 may create a new contact (with the same ID "user x").

Later, the user returns from another browser and chats with the site owner. As the website does not have a cookie, stream creator 251 may create yet another new stream ID "anon 3" and contact handler 242 may create a new contact "anon 3".

Now, the user logs into the website. At this point, there is a contact with an "anon 3" ID and a "user x" ID. Data merger 243 may merge the contacts "anon 3" into "user x", so that the login activity in the "user x" stream and the login activity for contact "user x" both point at activity streams "user x" and "anon 3". Stream merger 252 may merge any additional actions performed in this session by the user into the "user x" activity stream. Log creator 253 may log all activity data from the streams and save a copy of the log on activity database 255.

Figure 17:
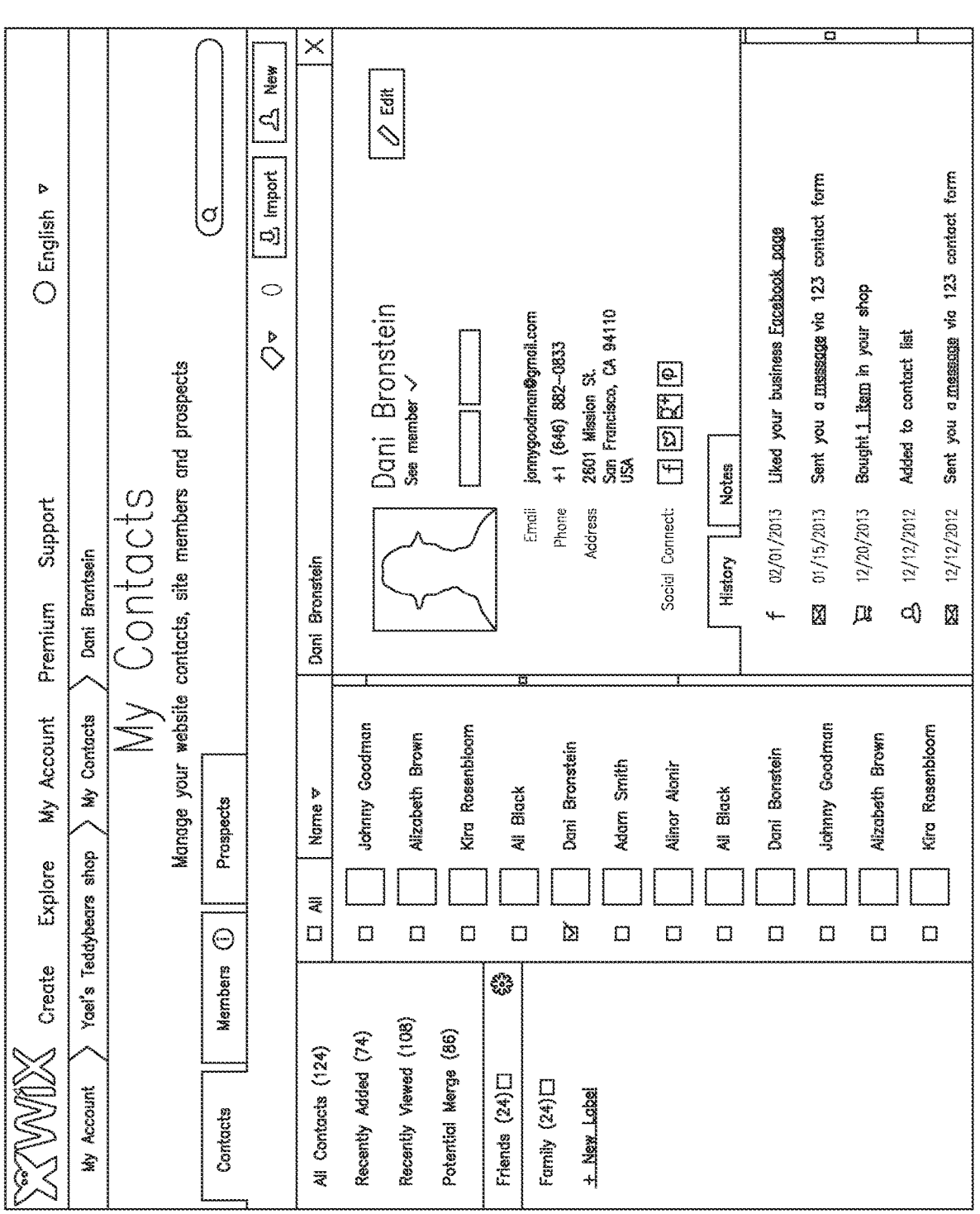
FIG. 17 is a schematic illustration of a sample graphical user interface displaying an activity stream associated with a contact, constructed and operative in accordance with the present invention.

It will be appreciated that the site owner may access the history of the activity stream for a given contact through a pertinent user interface provided by website building system 30 as is illustrated in FIG. 17 to which reference is now made. For a single contact "Dani Bronstein", the history of his website use can be easily accessed. It will also be appreciated that website building system 30 or third party application 40 may also provide an API to access the log information. It will be appreciated that the activities log may be used for optimization, user interface improvement, advertisement targeting etc.

It will be further appreciated that in parallel, contacts coordinator 240 may glean information from the data provided by the activity streams (messages) to build up a contact profile of the user in question. Data extractor 241 may extract data from activity messages and streams, data merger 243 may merge relevant data to a particular contact whose details may be stored and accessed from contacts database 245. Contact handler 242 may create new contacts, handle site user identity, anonymous users etc. and data and permissions handler 244 may handle the privacy protection and permissions of the relevant data. As discussed herein above data merger 243 may comprise a horizontal contact merger 277 and a vertical contact merger 276. Horizontal contact merger 277 may merge two unrelated contacts due to a detected common primary ID and vertical contact merger 276 may merge an anonymous contact with a contact associated with a registered user upon login or registration which may connect the two. Horizontal contact merger 277 may also comprise a virtual horizontal merger 278 to maintain two contacts as separate but linking them together so they are marked as representing the same contact—with or without merging the actual contact information. Vertical contact merger 276 may also comprise a vertical virtual merger 279 to maintain an anonymous contact and a contact associated with a registered user as separate but may link them together so they are marked as representing the same contact—with or without merging the actual contact information. Data merger 243 may also merge contact information (typically extracted by data extractor 241) into an existing contact. It will be appreciated that contact identifier 272 may track user identities using cookies and may recognize contacts that should be merged as discussed in further detail herein below.

Referring back to FIGS. 15, 16A and 16B, message passing may be performed on client 220, server 260 or both. It will be appreciated that third party applications 40 typically have a client side element and as well as a server side element, or at least a server side connection to the third party application 40 provider server 270. Hub 210 may process any messages between client 220 and third party applications 40 and hub 230 between server 260 and third party applications 40. It will be appreciated that data received by hub 210 may be processed and forwarded to hub 230 for further processing as described in more detail herein below.

Figure 18:
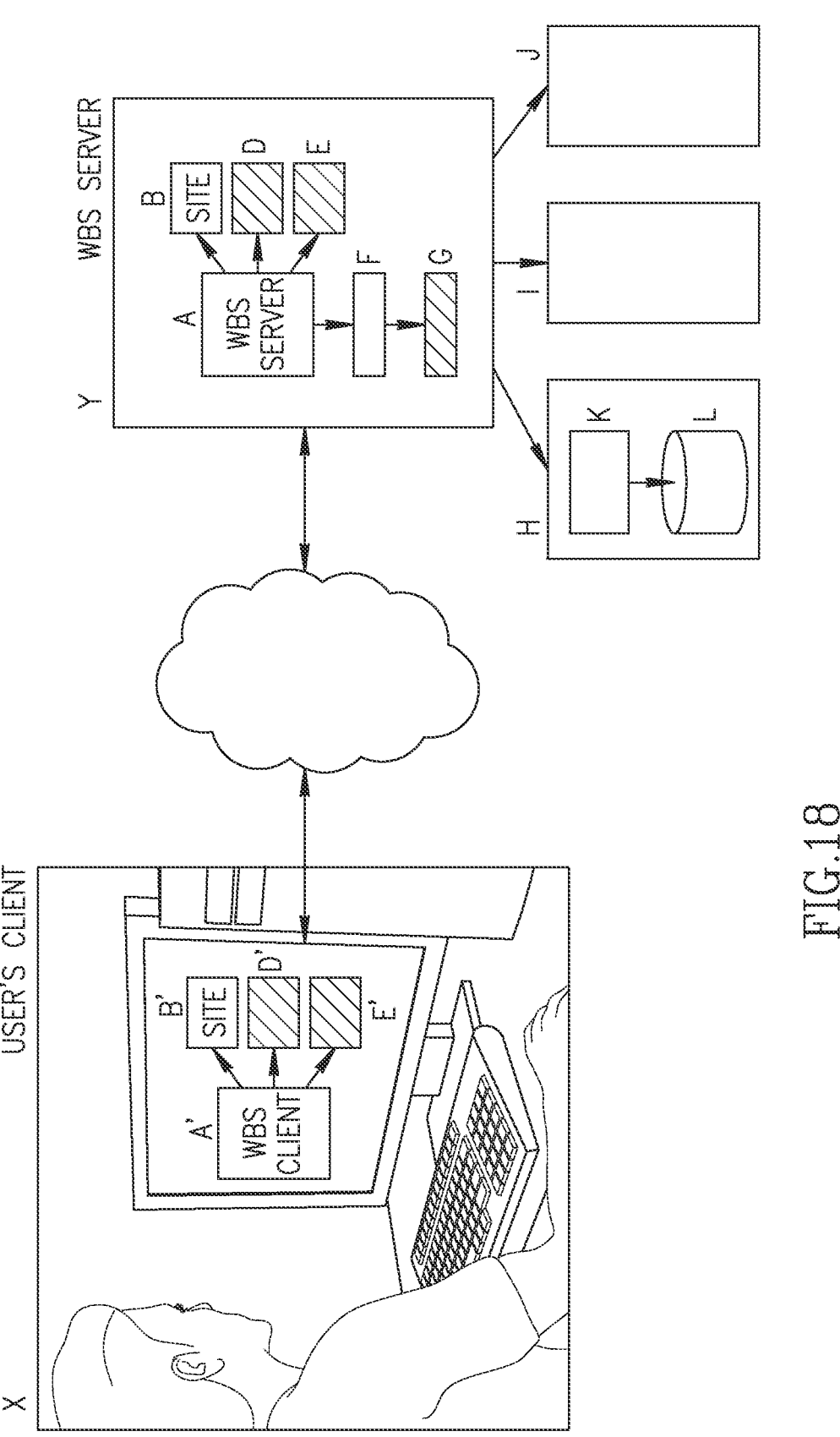
FIG. 18 is a schematic illustration of client-side and server-side third party application activity message passing.

Reference is now made to FIG. 18 which illustrates a message passing scenario between different platforms. A user client machine X may be connected to website building system 30 on server Y. Website building system 30 may be implemented using a website building system 30 client component A' and a website building system 30 server component A. When a created site is displayed, it may include client side elements (data/code) B' and a server side element B. The created site may also include three third party applications 40—TPA1, TPA2 and ETPA3.

TPA1 may be implemented with a client-side component D' and server side component D which connects with the TPA1 vendor server H. TPA2 may be implemented with a client-side component E' and server side component E which connects with the TPA2 vendor server I. ETPA3, however, may be a server-side-only third party application 40 implemented by server side component G connected to a website building system 30 third party application 40 support backend F. The two may communicate with the third party application 40 vendor server J.

It will be appreciated that TPA1 and TPA2 may exchange messages on the client (between components D' and E'), on the server (between components D and E) or on both. However, any communication with ETPA3 must be done on the server only. It will be further appreciated that there are advantages and disadvantages to using either method. Client-side activity message sending may be more interactive and provides faster user response. Server-side activity message sending, may be more robust, more reliable (e.g. a user can't close the browser window in the middle of the process), provide better assurance of correct order of message reception and may also allow activity messages to be sent to back end third party applications 40 installed on a backend or application dashboard. It will be appreciated that these back end third party applications 40 are not represented on the client side.

An example of a case using multiple third party applications 40 is that of a user adding a product to a shopping cart in third party application A (the activity type is "cart change"). Third party application A may then send an activity message to website building system 30 with the added product. Website building system 30 may then forward the activity to all third party applications 40 registered to cart changes. Since third party application B is registered it receives the activity. Third party application B may then display a message to the user such as "If you also add product X, you will get a discount" or "Share this site to get a discount".

Another example is a user "liking" (via Facebook for example) something in third party application A. Third party application A may then send an activity message to website building system 30 with activity type "Facebook like". Website building system 30 may then forward the activity to all third party applications 40 registered to "like" activities. Since third party application B is registered it receives the activity. Third party application B may show a re-engagement widget to the user and display a message such as "If you like this site, how about contacting the site owner?" or "Do you want a discount coupon?"

As discussed hereinabove, all communication may take place via hubs 210 and 230.

Router 211 may route the client side messages between the website and any third party applications 40. Router 211 may also route a message between hub 210 and hub 230 for further processing as described in more detail herein below.

Router and tracker 231 may route messages between the website and any third party applications 40 and may also track messages. It will be appreciated that third party applications 40 may also listen to messages on both the client and server. It will be further appreciated a third party application 40 may explicitly specify one or more activities to which it listens, e.g. listen to all "shopping cart—add item" activities. The third party application 40 may also specify activity classes to which it listens, e.g. listen to all Facebook related activities. Furthermore, the third party application may include a wild-card expression (applied to activity names) which is used to determine if an activity should be sent to the third party application or not.

It will also be appreciated that the third party application 40 may use an activity listener query. Such a query may refer to additional system information, including information not normally available to the third party application 40 itself, such as: user attributes (e.g. only registered users, only European users etc.), web site attributes or structure (e.g. only listen to a given activity on pages derived from a given page template), users history (e.g. only listen to cart check-out activity if the user made past purchases totaling over X) etc. Such a query may be specified by third party application 40, but may also be editable by the designer.

Thus router and tracker 231 may also track the messages that are being listened to by third party application 40. It will be appreciated that such activity listener query architecture is best implemented at the activity routing level (instead of being performed by an API call inside third party application 40) since it may allow the web site designer to perform tailoring and customization, without requiring third party applications 40 to be highly programmable and customizable. Router and tracker 231 may also help in preserving user privacy, since the web site designer does not have to provide the additional information (required for the routing decision) to the third party applications 40 involved. It may also save unneeded invocations of communication with third party applications 40 which are often hosted on separate servers.

It will be appreciated that it is the user (website visitor) that visits, registers and provides information to the website. The user may actually be unaware that the website he or she is accessing is built using a combination of website building system 30, components, constructed websites and third party applications 40. Thus, responsibility for user privacy ultimately lies with the website owner (who is also responsible for activities undertaken by the third party applications 40 included in his or her website).

It will be further appreciated that user profile information may be accessed by third party applications 40 (and other website building system 30 components) based on privacy rules defined by the website building system 30 and through an API provided by website building system 30. Furthermore, the containing site as the well as the third party applications 40 contained in it may use the contact information to communicate with the user (via e-mail or otherwise).

It will be appreciated that there may be three major privacy-related issues. The first is the interaction of the website and website building system 30 with the third party application 40 provider. The web site (and web site building system 30) may not completely trust third party application 40 with its use of user data, e.g. that third party application 40 will not mass-mail (using the sites' provided user e-mails), spam users who requested to be removed from mailing, or transfer user personal information to a 4th party. However, this can be resolved in the following ways:

The website building system 30 vendor may require the third party application 40 providers to sign a Terms of Use (ToU) agreement when adding them to the web site building system 30 application market. Such an agreement may state that the third party application 40 (and third party application 40 vendor) may not misuse or further disclose the users' information. The website building system 30 vendor can then penalize the third party application provider if it misuses the information (e.g. disabling third party application 40, removing third party application 40 from the web site building system 30 application market etc.). Private policy enforcers 213 and 233 and private data proxy 234 may enforce the privacy policy on third party applications 40 as described in more detail herein below.

The second privacy-related issue is the interaction of website and website building system 30 with the user (site visitor). The website must provide the user with a clear understanding of how his or her personal data may be used, receive agreement form the user and abide by the terms to which the user agreed. Website building system 30 requires all published sites to provide the user with a ToU document which defines the allowed use of the private information belonging to the user, and the user is required to electronically sign that document. The site must then abide by these terms and allowed use. Website building system 30 may also include a sample ToU page in each website template it provides. Private policy enforcers 213 and 233 may ensure that the terms of use of the ToU document are kept. Private policy enforcers 213 and 233 may also ensure that only allowed information is provided to the TPA by deleting or rearranging the relevant data.

The third privacy-related issue is the support of unsubscribe requests. The site must provide the user with an option to unsubscribe from any marketing e-mails. These may be handled by data and permissions handler 244 described in more detail herein below.

Data and permissions handler 244 may also handle the different user permissions set by different users as described in more detail herein below.

Private data proxy 234 may allow website building system 30 (and the web sites built in it) to keep all or some private data in a secure repository managed by website building system 30 and may provide the third party application with alternative unique ID's (instead of the private data) which can be used by the website building system 30 to retrieve the hidden private data. For example—an e-mail address is replaced with an alternate "e-mail address ID" provided to the third party application 40, so that third party application 40 cannot access the actual e-mail address.

Private data proxy 234 may also provide a set of interfaces for various communication methods (e.g. e-mail, social network messaging etc.) which may be used by third party application 40 to contact/send messages to the user without third party application 40 actually accessing private data associated with the user. Such private data may include all identifying details through which a user may be contacted, including (for example): name, address, e-mail, phone (including SMS/MMS), unified communication ID (Skype etc.) and social network ID.

Private data proxy 234 may therefore enforce user permission field limitations, enforce user unsubscribe requests and throttle user message sending, e.g. allow no more than 100 e-mails per day for a given third party application 40 working for a given site. Private data proxy 234 may define the proxy parameters and which private data to reveal to the third party application and which to hide—on per-third party application 40 basis, and may set them on a field-by-field basis.

For third party applications 40 hosted on website building system 30 servers, private data proxy 234 may provide an alternate unique ID which is similar in form to the original private data (e.g. provide an alternate dummy e-mail instead of the original private user e-mail) and then "capture" the call to use this information and forward the e-mail (in this example) to the right address. This can also be used to detect any third party applications 40 exceeding their allowed privileges.

It will be appreciated that the website owner might desire to provide limited or modified information to any specific third party application 40. This could be, for example, due to general security concerns, specific privacy commitments regarding any elements of the users' data or a regulatory requirement peculiar to a specific industry or application. Private policy enforcers 213 and 233 may implement any such changes made by the website owner and overwrite current settings.

An example would be a website which handles medical information which might be interested in blocking some personal details from the contact information when handing it to a general geographical user distribution analysis third party application 40. In another example, a third party application 40 might have a problem in dealing with certain types of contact information. A website owner who would like to continue using the third party application 40 (despite the known bug) may want to filter out the contacts which trigger the known problem, or modify the data so as not to trigger the problem.

Translator and adaptors 212 and 232 may apply prespecified message translation and content adaptation rules. Each such rule may include conditions such as to which third party application(s) 40 it applies to, a filtering criteria selecting which messages it applies to, a transformation rule (such as discard the given message (as far as the relevant third party application 40) is concerned) or a transformation to be applied to a given field or fields in the activity data structure.

In this way, hubs 210 and 230 may deliver different versions of the activity data structures to different third party applications 40 (or not deliver at all)—according to the specifications made by the site owner.

The pertinent website building system 30 may also support the validation and signing of messages, to strengthen the system against failures and break-in attempts (such as a man-in-the-middle attack aimed at modifying third party application 40 message payload data). Therefore each third party application 40 registered with the website building system 30 may have two sets of private/public keys: one used to decode messages sent from the third party application 40 to website building system 30 (the incoming key) and one used to encode messages sent from website building system 30 to the third party application 40 (the outgoing key).

For example, third party application A may send website building system 30 a message. The message may be sent with the third party application ID for the site—the third party application external ID (having a third party application scope) and it may be signed by the third party application. Website building system 30 may receive the message. Validator and signer 235 may validate the signature using the incoming key of third party application A. If the said validation fails, validator and signer 235 may report the incoming message as invalid and the message is not further transmitted.

Validator and signer 235 may translate the external ID associated with the message with an internal site ID. Validator and signer 235 may ascertain which third party application(s) 40 should get the message.

For example, for each third party application 40 B1 . . . Bn, validator and signer 235 may find the external ID of third party application B. Validator and signer 235 may then create the message to third party application B and instruct translator and adaptors 212/232 to apply any applicable filtering and transformation rules as described hereinabove. Validator and signer 235 may then sign the message with the outgoing key for third party application B and send the message to third party application B via router and tracker 231 (or router 211). Third party application 40 B may then receive the message and validate the signature. If the current validation fails, the message is reported as invalid and not further processed. It will be appreciated that validator and signer 235 may only perform server side and not client side processing to ensure that secret validation data is not sent to an untrusted client.

As discussed herein above, system 200 may employ multiple types of communication between website building system 30 and third party applications 40. These may include, for example control communication, e.g. website building system 30 commanding the third party application 40 to shut down, functional communication, e.g. a shopping cart third party application 40 sending the total purchase amount through website building system 30 to a billing third party application 40 so as to affect the payment or activity communication which is the example discussed in this application. It will be appreciated that these different types of communication have different profiles and requirements, e.g. in terms of amount of messages sent, priority, robustness, response time requirements etc.

In particular, system 200 may include activity reports which are very frequent (e.g. if third party application 40 graphical user interface (GUI) events are made into reported third party application 40 activities). Such numerous activity reports may overwhelm the parts of the system handling more critical messages. Therefore system 200 may implement multiple communication channels (e.g. using different ports, multiple concurrent sessions etc.) so that each class of messages is sent via a separate channel. This way, activity reporting uses a side channel, and is parallel to and does not interfere with command and functional communication.

As discussed herein above, system 200 may gather activity information in order to create and enhance contact information via contacts coordinator 240 and activity coordinator 250 as well as collate activity events associated with a particular contact. For each activity message that is routed through hubs 210 and 230, contacts coordinator 240 and activity coordinator 250 may process the information. Stream creator 251 may create contact specific data streams from the activity messages and the elements of contacts coordinator 240 may extract the data and process it before storing it on contacts database 245.

Therefore each activity stream may have a constructed contact associated with it which may gradually be enhanced with data extracted from the activities performed under the data stream. It will be appreciated that contacts coordinator 240 may also recognize the existence of related contacts— multiple contact records which are found to describe the same person. Contact identifier 272 may recognize such records by matching a primary ID field, such as e-mail, phone number, social security number, Facebook ID etc. It will be appreciated that some primary ID fields are multi-value fields (e.g., a person can have multiple identifying e-mails), whereas some are strictly single-value fields (e.g., a social security number).

Therefore data merger 243 may merge contact fields extracted from a new activity into the current constructed contact and may merge a constructed contact constructed for an anonymous user during its use of the website into the predefined saved contact once the anonymous user has performed a login operation and has become an identified user (this may be known as "vertical" merging). Horizontal contact merger 277 may also perform "horizontal" merging of two different contacts (constructed contact or stored contacts) when it detects that these are related contacts which refer to the same user. As discussed herein above, such merging may be performed by actual merging (i.e. converting two separate contacts into a single contact), merging one contact into the other or performed through virtual merging (i.e. maintaining the two contacts as separate ones but linking them together so they are marked as representing the same user—with or without merging the actual contact information and activity streams). It will also be appreciated that even in virtual merging further added information may be added to the multiple linked virtually-merged contacts.

Thus, data extractor 241 may extract contact-type information from the pertinent data activity structure and data merger 243 may integrate the contact-type information into the contact associated with the activity streams (anonymous or identified). If the contact-type information I contains a primary ID field, data merger 243 may check for related contacts based on the primary ID field value and if found, merge these contacts. Data merger 243 may also check if the activity establishes the users' identity in the site (e.g. a site login activity) and if so, merge the anonymous contact with the existing contact record stored for the user, and make it an identified contact from now on.

It will be appreciated that contact identifier 272 may implement multiple methods to identify the site users, such as by using a cookie to track a session by a single anonymous user (which did not login into the site), using site login for registered users, through a social login for site users whose account is associated with a social network or by matching primary ID fields (such as email/phone) to identify that two user profiles describe the same user.

It will be further appreciated that site users whose details are stored in contacts database 245 may be classified as anonymous users that did not register at the site; registered users and potential users—records (imported from external sources) of potential users who have not yet officially registered on the site.

Since the pertinent website may install permanent cookies which persist from session to session, multiple anonymous sessions which may run on the same computer with the same browser, may continue to contribute information to the same contact record. Therefore, even an anonymous user may have considerable context and contact information.

Registered users must provide an ID which is unique for the specific site. Multiple types of ID may be used such as a separate site-specific ID (e.g. username), an external identifier, such as e-mail, phone number or social security number or an external identifier provided by a different system, such as a social network ID, Google ID, OpenID identification etc.

A user registering through a social network login may allow the site to use the personal information available in the social network to populate the site profile of the same user. Data extractor 241 may also re-visit the social network profile to detect any changes to this personal information, and possibly update the site user profile.

A registered user must generally login into a system so as to establish his or her identity, though the system may provide a "keep me connected on this system" option. Such login procedure may be explicit—the user invokes a login dialog, implicit—the user is required to provide some identifying details, e.g. when adding a talkback to a blog, or may be an external login based—the system invokes a login procedure associated with a different system, such as a social network login or an OpenID login. Login procedures may also be affected through a physical device (e.g. a security token connected to the system directly or via a wireless interface) or though biometrical information use (including both users' biometrical parameters, e.g. fingerprint or iris scan, as well as users' behavior detection such as typing pattern detection)—or any combination of the methods detailed above.

It will also be appreciated that a social login procedure may interact with a regular login in both directions. For example, a social ID is associated with a site member ID, so that a social login will imply a site login or a site member ID may be associated with one or more social network IDs, so that a site login may also identify the user to one or more social networks When a user performs an explicit logout, contact handler 242 may generate a new anonymous user cookie and thus open a new anonymous session (or session series) whose activities will be saved under this new anonymous contact. This new anonymous contact may possibly be merged upon further login with the later identified contact.

Figure 19:
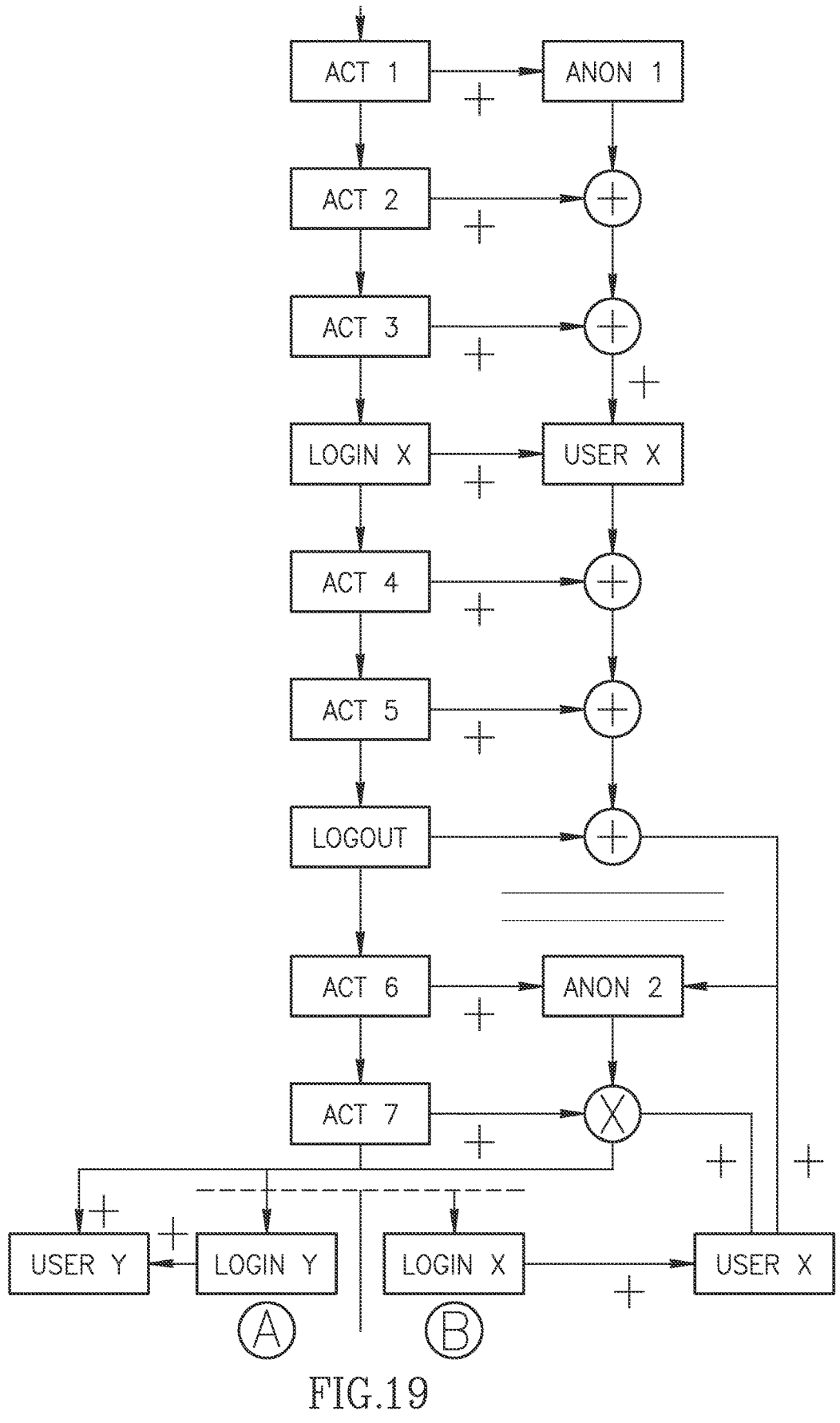
FIG. 19 is a schematic illustration of login/logout handling during a user website session.

Reference is now made to FIG. 19 which illustrates the login and logout process of an anonymous user. A user may begin using the system anonymously. Contact handler 242 may create a contact and stream creator 251 may create activity stream anon1 automatically when the user performs the 1$^{st}$ third party application action act1. Stream merger 252 may merge the information from act1 and from the following activities act2 and act3 into user anon1.

Once the same user has performed a login as user X, data merger 243 may merge the anon1 contact (and any other pertinent contact data retrieved from the activity stream) into the contact information of user X. It will be appreciated that stream merger 252 may also merge information extracted from the further actions act4 and act5 into a single stream and data extractor 241 may then extract the contact information of user X. When user X performs a logout, contact handler 242 may create a new cookie, separating further activities from the user X. Thus, when a new activity act6 is performed, contact handler 242 may create a new anonymous contact anon2 and data extractor 241 may save its extracted contact details (and activities) under a newly created anonymous contact anon2.

If (as in scenario A) user anon2 performs a 2$^{nd}$ login as user Y, data merger 243 may merge the contact anon2 (as updated by act6 and act7) into the contact details for the identified user Y, together with any further activity.

If (as in scenario B) user anon 2 performs a $2^{nd}$ (repeated) login as user X, data merger 243 may merge the contact information for user anon2 (as updated by act6 and act7) into the contact details for user X (already updated to reflect act1-act5) together with any further activity.

It will be appreciated that activity data structure associated with activities may also include contact details. Data extractor 241 may extract this information and forward it to data merger 243 which may integrate it with the existing contact information in contact database 245 possibly enhancing it. It will be further appreciated that data extractor 241 may extract details from specific activity messages, from entire streams, from other contacts or from external sources such as IP to geo address translation services as described in more detail herein below. As discussed herein above, the contacts in contact database 245 may also contain contact details that are explicitly provided by the user as part of the registration or sign-up process to the web-site, extracted from a social networking account used by the user when signing up to the web site (via a social login/register feature) or provided by the user when updating his or her user profile. Data extractor 241 may also retrieve contact information from an external source (e.g. when a user specifies a US zip code only, and this is used by the site to retrieve the full address information from an external zip code decoding web service).

As discussed herein above, contact identifier 272 may recognize two contacts as related based on a major ID field such as user name, e-mail or phone number. Once contacts A (new) and B (existing) are found to be related, data merger 243 may merge A into B (B is the master). This is done using field merging rules such as the following:

B1=B or A (as in "B||A"); Take B, and if B is null or empty take A;

B1=math-func(A, B); Important private cases are:

B1=A+B; for example—number of visits, total purchases;

B1=min(A,B); for example—date joined site;

B1=max(A,B); for example—last activity date;

B1=list-unite (B, A); concatenate the list A at the end B, removing elements in A which are duplicative of elements in B (i.e. B1=B & (A–B)). Data merger 243 may determine duplicates among list members according to the following rules:

For lists consisting of regular values (i.e. scalars), use a regular value comparison;

For lists consisting of structures, use a specific sub-field of the structure as a comparison key. For example, the address type (home, business, delivery, . . . ) in website building systems 30 which support multiple addresses;

Normalized value comparison. See (for example) the handling of phone numbers below:

Unite A into B if structure A is a more detailed version of structure B (described in more detail herein below) and Higher certainty score—a value may have a certainty score attached to it (e.g. having a different certainty score for information directly provided by the user vs. information deduced about the user). Data merger 243 may select the value having the higher certainty score.

It will be appreciated that some field types have a normalized format. For example, phone numbers may be normalized into a normalized US format (e.g. (999)555-1234) or international format (e.g. +1-999-555-1234). Data merger 243 may convert the field value into normalized format for comparison, such as when comparing primary contact keys (such as phone number) and when checking for duplicates in merged lists.

Data merger 243 may compare two structured values that have the same underlying structure—for example, an address value which consists of multiple sub-fields (country, state, zip code, street, number etc.) Structure Y is a detailed version of structure X if each of the non-empty fields in X has a value equal to that of the same field in Y, i.e. Y includes all non-empty field values of X, and possibly some additional field values. Therefore data merger 243 may unite A into B if A is a detailed version of B, and A is not identical to B.

It will be appreciated that the data extractor 241 may deduce a contact address from the IP address from which the activity has come from. This is used only if activity has arrived from a browser session and the user does not have an address. Thus data extractor 241 may extract the state/country information according to geographical information of the IP address. In this case, the address is marked as "estimated geo IP address". This is required so as not to interfere with future address merging—due to the address field containing an existing (and possibly inaccurate) address based on the IP mapping, which may prevent a later detailed (but basically different) address to be saved in contacts database 245.

Data merger 243 may also handle tag collision for merged lists. It will be appreciated that in the case of merging lists, it is possible to get into a situation where there are two entities, one from contact A and the second from contact B, which are different, but have the same tag. In this scenario, data merger 243 may merge the list by having in the list both entities, with the same tag.

Thus combining [{tag:"home", email:"a@b.com"}]+ [{tag:"home", email:"c@d.com"}] may create [{tag: "home", email:"a@b.com"}, {tag:"home", email: "c@d.com"}]. This would be used if the fields being merged are marked with "non unique list tags allowed".

Data merger 243 may also use linguistic, syntax or other text analysis methods, as well as consulting with external data sources or services when trying to unite contact information. For example, the user may have written his or her home address street name in two different ways in two activity records—but specified the same home number, city and zip code. Uniter 273 may apply text analysis (e.g. soundex algorithms) when comparing two entries, and may also compare the two versions of the street name to an external source of street names for the given city and zip code. In such a case, uniter 273 may select the canonical street name if both addresses are similar (but possibly not identical) to this canonical name and the all other address data fields have the appropriate values.

Data merger 243 may also merge contact information according to login/session information. A user may use the site without performing login or registration, start a session, perform some activities as part of this session and later register or login—thus associating the session with a newly created or existing registered user profile (containing contact information).

Once a user starts a session (as anonymous), contact identifier 272 may track the user during the session (using cookies, session ID etc.) and contact handler 242 may create a constructed contact for the specific anonymous user, based on the activities performed by the user during the anonymous session. Router and tracker 231 may also continue tracking the anonymous user across multiple sessions from the same computer. This can be done by using a persistent cookie (rather than session cookie).

When a user registers, data merger 243 may use the constructed contact information to initially fill in the user profile. If the user logs in, data merger 243 may unite the constructed contact information initially with the existing user profile. It will be appreciated that the constructed contact information is merged according to the users' site ID, as data merger 243 may not have any other primary ID (e-mail etc.) to use in the constructed contact for merging. It will also be appreciated that any such merging may expose contradictions in the collected information. When merging the anonymous constructed contact with the existing profile data, contradictions may occur and are unavoidable. For example, an anonymous user fills a data form (displayed by some third party application 40) under the name of John Smith, and then later logs in into an account under the name Jane Doe (using the same or a separate browser session). It is possible (for example) that the later login was really done by a 2nd person using the same computer, or that the user used a pseudonym in the contact form to preserve his or her privacy. The same may apply when data merger 243 merges multiple anonymous constructed contacts.

Contradiction resolver 274 may typically handle contradictions automatically, as most fields (including primary key fields such as e-mail and phone) are list fields which may contain multiple values. This may apply only to multiple uses of the same underlying site. Any such contradiction which cannot be resolved (e.g. by merging the multiple values into a list value) may be flagged for possible manual handling by the site owner, by the end-user (which may determine which value to use) or using other techniques.

Thus, it is possible that the constructed contact information may reflect not a single person, but rather the combined set of users accessing the same site via the same computer.

As discussed herein above, data merger 243 typically merges contacts according to primary ID fields (such as e-mail and phone numbers) whenever they are created or modified.

The input is a contact record (the input contact C) with one more primary ID field(s) having one or more values (e.g. a contact record with 2 e-mails and 3 phone numbers). The multiple primary ID fields may be required as a user may have (for example) home/work/cell phone numbers and home/work e-mails—and the user may use any of them in a contact form interchangeably.

Data merger 243 may normalize the primary key values and create a query for a contact record containing any of the normalized primary key values, e.g. "(phone=P1 or phone=P2) or (email=E1 or email=E2)". Data merger 243 may further limit the query to the contacts database 245 for the specific site. Data merger 243 may also query contacts database 245 and retrieve a matching contacts list L (which includes the input contact C).

If the input contact is a registered site member (of the specific site), data merger 243 may remove contact C from list L and merge all remaining contacts in list L into contact C. Data merger 243 may then save the updated contact C back to contacts database 245 and remove all remaining contacts in list L from contacts database 245. As discussed herein above, data merger 234 may alternatively perform virtual merging, uniting all contact information (i.e. update all contact records to contain all available information) and marking the matched contact records as belonging to the same person (instead of deleting the "duplicate" contact records). This may be needed, for example, if third party applications 40 store or use internal ID's specific to the contact records, so the deleting contact records would make these third party applications 40 fail. The same handling (i.e. marking contacts as related rather than deleting contacts) may apply to the other cases discussed in more detail herein below.

If the input contact is NOT a registered site member, data merger 243 may check to see how many site member contacts are in list L. If there are 0 site members, it may remove contact C from list L and merge all remaining contacts in list L into contact C. Data merger 243 may then save the updated contact C back to contacts database 245 and remove all remaining contacts in list L from contacts database 245.

If there is 1 site member (contact D), data merger 243 may remove contact D from list L and merge all remaining contacts in L (including contact C) into contact D. Data merger 243 may then save the updated contact D back to contacts database 245 and remove all remaining contacts in list L from contacts database 245.

If there are two or more site member contacts (D, D1, D2, . . . ), data merger 243 may choose contact D from the site member contacts found (D, D1, D2, . . . ) and remove contact D from list L. It may then create a sub-list LL from list L containing the contacts in list L which are not site members. Data merger 243 may then merge all remaining contacts on list LL into contact D. Data merger 243 may then save the updated contact D back to contacts database 245 and remove all remaining contacts in list LL from contacts database 245.

As discussed herein above for login merging, contradictions in data may occur. However, since list value creator 275 may create list valued fields (having multiple values) and may define clear precedence between the contacts, the problem would not occur in most cases.

For example, when data merger 243 merges the following contacts:

Contact1=[Phone1,em1];
Contact2=[Phone1,em2];
Contact3=[Phone2,em2];
It may generate the combined contact:
Combined-Contact=[Phone=[Phone1,Phone2],    Email=
    [em1,em2]].

It will be appreciated that contacts database 245 may include contact information from multiple sources, and with different level of permissions for its use. The following discussion refers to e-mails; however, the discussion and technology applies to any type of information used to contact the user as noted above (phone, fax, Skype ID, instant messaging ID, social network ID, etc.).

For example, the way in which an e-mail address was provided to the site may indicate different permissions for its use. Some possible sources for e-mail addresses are, registration ID; contact form, newsletter sign-up and an unsubscribe request. The e-mail addresses may further differ in terms of the "allowed use agreement" electronically signed by the user.

It will be appreciated that website building system 30 typically has information concerning the allowed uses for a given e-mail. However, the website owner may have different, separate or additional information. For example due to the nature of the different sign-up forms in the site or due to having contacts in the system imported by the website from a different source which includes additional usage permissions information.

Data and permissions handler 244 may enforce the right use policy on third party applications 40 used in the site in order to assist the website owner in managing this information.

Therefore the contact record for the pertinent contact may include two fields of information. The first field is the website permissions field containing derived or suggested permissions calculated by the website from the user activity. A contact form implies functional emails only whereas a subscribe form may implies recurring emails. The second field is a site owner permissions field based on the website permissions field value. The site owner may change the website recommendations and do whatever he or she likes, but he or she is responsible for any use which exceeds the permissions defined by the website permissions field.

It will be appreciated that the website permissions field value represents the best knowledge of the website of the intention of the users. The site owner permissions value is the one assigned by the website and used by third party application 40 and other parts of the system (e.g. by a third party application 40 providing newsletter sending).

Data and permissions handler 244 may use these permissions fields to define the permissions in a number of ways. For example, data and permissions handler 244 may implement any of the following codes or combinations and variants thereof (for e-mails as well as other contact ID's):

Unknown—an e-mail was extracted from unknown sources and cannot be used for any e-mail sending.

E-mail ID—an e-mail provided for registration purposes. It cannot be used for any e-mail sending except for registration related issues, such as registration confirmation, a forgotten password and suspected security breach notification.

Functional e-mail—provided for a specific function and allows one-time emails. For example, purchase confirmation e-mail, or an e-mail provided for a specific contact form.

Recurring e-mail—allows multiple and periodic subscriptions and advertisements to be sent by the specific website. This requires explicit subscription/approval.

Shareable e-mail—allows multiple and periodic subscriptions and advertisements to be sent by the website as well as its partners (third party applications 40, 4<sup>th</sup> parties). This requires explicit subscription/approval, and may include detailed information about allowed sharing.

Opt out—the user has explicitly unsubscribed. No e-mails may be sent to the user (except possibly for the opt-out notice).

It will be appreciated that data and permissions handler 244 may use alternate methods, such as a permission bitmask (similar to the one used on UNIX and Linux systems) or ACL (Access Control List) mechanism. Data and permissions handler 244 may also implement separate permissions fields for separate parts of the contact information (e.g. e-mail, Instant messenger address, social network ID etc.)

A typical use scenario is one in which contacts database 245 contains a first set of e-mails gathered from contact forms and second set of e-mails from subscription requests. The website may call a newsletter sending third party application 40, knowing that the third party applications 40 would send e-mails only to users belonging to the 2<sup>nd</sup> set of users (the one who sent subscription requests).

The advantages of such a system include better protection (both technical and legal)—for both the website and the website owner—from accidental spamming of the users or private information misuse as well as the capability to actually enforce privacy policy when used in conjunction with private data proxy 234 as described herein above. It may also ensure that unsubscribe requests are more strictly enforced.

Therefore a user may generate a stream of activities between the pertinent website building system 30 and any related third party applications 40. These streams may be known as activity streams. Each activity stream may be used as an information source for a single contact. The activity data structure of individual streams may also be merged to form the contact if it may be determined that the different activity streams come from the same source. For example, a single user may work anonymously through two devices such as a mobile device and a personal computer. Such a user may create two anonymous streams under which a message may be stored. Once the streams have been identified as being associated with the same user, they may be merged.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be appreciated that a variety of programming languages may be used to implement the teachings of the invention as described herein.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for collecting third party application activity data on users for a website, said system comprising:
   a processor;
   a hub running on said processor configured to receive at least one activity message from 2-way communication between a website and at least one third party application included as an instance in said website and hosted on a third party application provider server, wherein an activity message comprises a descriptive address of said at least one third party application and information associated with an interaction of a user of said website with said at least one third party application and identification information of said user of said website;

a user identifier configured to identify a user associated with said activity message according to said identification information;

a sequence creator configured to start a sequence of activity messages associated with said identified user by storing the activity message in a database as a first message of a sequence if said user is identified for the first time;

a sequence merger configured to add said activity message to an existing sequence of stored activity messages associated with said identified user if the user was identified previously; and a data merger configured to store a plurality of activity streams associated with said identified user in said database.

2. The system according to claim 1 and wherein said hub comprises at least one of:

a router and tracker to route and track said at least one activity message between said website and said least one third party application;

a private policy enforcer to enforce terms of a privacy agreement between said website and said least one third party application;

a translator and adapter to apply pre-specified at least one message translation and content adaptation rules between said website and said least one third party application;

a private data proxy to implement at least one of: a private data proxy and private data replacement and to enforce user permission field limitations between said website and said least one third party application; and a validator and signer to validate a signature of an activity message using the incoming key of said at least one third party application, to translate the external ID associated with said activity message with an internal ID of said website and to sign an outgoing said activity message using an outgoing key of said at least one third party application.

3. The system according to claim 1 and further comprising a log creator to log activity data from said sequence of activity messages into said database.

4. The system according to claim 1 and further comprising at least one of:

a user handler to create at least one of: an identifiable new user and an anonymous user and to track user activity during a session of said website; and a data and permissions handler to handle privacy protection and permissions of extracted user related information.

5. The system according to claim 2 and wherein said router and tracker supports routing of said at least one activity message using application specified listening queries for said at least one third party application.

6. The system according to claim 1 and wherein said sequence merger comprises an activity-to-sequence merger configured to merge said at least one activity message into said sequence associated with said identified user and a sequence-to-sequence merger configured to merge at least two separate sequences into a single sequence.

7. The system according to claim 6 and wherein said sequence-to-sequence merger comprises at least one of: a horizontal sequence merger to merge said at least two separate sequences according to a identified common user and a vertical sequence merger to merge a sequence created for an anonymous user with a sequence associated with a registered user upon a login or registration which may connect the two.

8. The system according to claim 1 and wherein said user identifier is further configured to at least one of: locate identical primary ID field values in at least two contact information records, locate primary key field values within in least two contact information records which are identical when normalized, identify site users using a cookie, identify a site user using site login for registered users and identify a site user through a social login for site users with an account associated with a social network.

9. The system according to claim 1 wherein said data merger comprises at least one of:

a uniter to unite user information using at least one of: linguistic, syntax, text analysis and consultation with external data sources and services;

a contradiction resolver to resolve contradictions between contact information records according to predefined rules;

a list value creator to create list value fields to define a clear precedence between said contact information records;

a horizontal user merger to merge two unrelated users due to a detected common primary ID; and a vertical user merger to merge an anonymous user with a user associated with a registered user upon login or registration which may connect the two.

10. The system according to claim 9 and wherein said horizontal user merger comprises a virtual merger to maintain at least two contact information records as separate and to link them together so they are marked as representing the same user.

11. The system according to claim 9 and wherein said vertical user merger comprises a virtual merger to maintain an anonymous user and a user associated with a registered user as separate and to link them together so they are marked as representing the same user.

12. The system according to claim 1 wherein said at least one activity message has a standardized format and wherein said standardized format is at least one of defined by a predefined schema, inheritance, a call back link, encoded and defined by said at least one third party application or based on external formal, industry or de-facto standard.

13. The system according to claim 1 wherein said system is implemented on at least one of: a server, a client and a server/client arrangement.

\* \* \* \* \*